US008000835B2

(12) United States Patent
Friz et al.

(10) Patent No.: US 8,000,835 B2
(45) Date of Patent: Aug. 16, 2011

(54) CENTER OF GRAVITY SENSING AND ADJUSTING LOAD BAR, PROGRAM PRODUCT, AND RELATED METHODS

(75) Inventors: Daniel C. Friz, Grand Prairie, TX (US); Mark R. Bates, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1132 days.

(21) Appl. No.: 11/801,510

(22) Filed: May 10, 2007

(65) Prior Publication Data

US 2008/0131248 A1 Jun. 5, 2008

Related U.S. Application Data

(60) Provisional application No. 60/872,259, filed on Dec. 1, 2006.

(51) Int. Cl.
*G06F 7/00* (2006.01)

(52) U.S. Cl. ...................................... 700/230; 294/67.5

(58) Field of Classification Search ................ 294/81.3, 294/67.21, 67.5; 340/685; 254/268, 269, 254/273, 275; 414/561, 138.3; 700/228, 700/229, 230

See application file for complete search history.

(56) References Cited

U.S. PATENT DOCUMENTS

| | | | | |
|---|---|---|---|---|
| 3,596,968 | A | 8/1971 | Holm | |
| 4,597,602 | A | 7/1986 | McGriff | |
| 5,154,561 | A * | 10/1992 | Lee | 414/138.3 |
| 5,184,860 | A * | 2/1993 | Bouillon et al. | 294/67.31 |
| 6,216,602 | B1 | 4/2001 | Fukuzaki et al. | |
| 6,496,765 | B1 * | 12/2002 | Robinett et al. | 701/50 |
| 6,695,126 | B2 | 2/2004 | Minamikawa | |
| 7,031,883 | B1 * | 4/2006 | Lee | 702/187 |
| 7,152,349 | B1 * | 12/2006 | Rowlands | 37/397 |
| 7,399,019 | B2 * | 7/2008 | Malmgren et al. | 294/81.51 |
| 2005/0016005 | A1 * | 1/2005 | Voecks | 33/344 |

* cited by examiner

*Primary Examiner* — Saúl J Rodriguez
*Assistant Examiner* — Stephen Vu
(74) *Attorney, Agent, or Firm* — Bracewell & Giuliani LLP

(57) ABSTRACT

An apparatus, program product, and related methods for gravity stabilizing a suspended load are provided. The apparatus includes an center of gravity stabilized automated adjusting load bar in communication with a mobile cart which allows an operator to enable automated stabilization of a load. The adjusting load bar includes redundant first and second control and drive systems. A third control system can both monitor sensed data and the movement commands of first and second control systems, and can monitor the resulting physical movements. If a movement command and the resulting movement does not match or if there is an out of tolerance mismatch between movement commands of the first and the second control systems, the third control system can automatically detect this condition and shift into an emergency stop condition.

18 Claims, 11 Drawing Sheets

CENTER OF GRAVITY SENSING AND ADJUSTING LOAD BAR, PROGRAM PRODUCT, AND RELATED METHODS

RELATED APPLICATIONS

This patent application claims the benefit of and priority to U.S. Provisional App. No. 60/872,259, filed on Dec. 1, 2006, incorporated by reference herein in its entirety.

This invention was made with Government support under Contract Number N00019-02-C-3002 awarded by The Department of the Navy. The Government has certain rights in this invention.

BACKGROUND OF THE INVENTION

1. Field of the Invention

The present invention relates generally to the field of load control, and particularly to the controlling and safely stabilizing a load being suspended under an overhead carrier. More specifically, the present invention relates to a system, apparatus, program product, and related methods for gravity stabilizing a suspended load.

2. Description of the Related Art

Modules or portions of the aircraft are assembled at various stages along an assembly floor. When the work in any particular stage is completed, an overhead crane extracts the module and delivers it to the next stage. Because components are being added at each staging area, the center of gravity of the module changes from stage to stage. The module needs to be lifted and transported along its center of gravity. Finding the center of gravity at each staging area can be extremely time-consuming. This directly affects the span of time to move a component via, for example, an overhead crane.

Load bars can be used as an interface between the overhead crane and the component being lifted. Conventional load bars, however, typically rely on turnbuckles to adjust the load bar, to allow the component to be lifted correctly, e.g., horizontal to the ground or in a level orientation. Moves of various components using such conventional load bars, for example, however, could result in the consumption of one hour or more to adjust the load bar and three hours or more to perform the move.

Further, each component staging area generally requires a separate spreader bar assembly to extract the module for each module version. Thus, if a component has, for example, three variants and six predicted lifts during the assembly process, it could potentially take up to eighteen different load bars to perform the required moves using the conventional equipment and methods. The requirement for eighteen load bars, in turn, besides being undesirable due to equipment costs, significantly increases floor space requirements.

Automated systems designed for centering a lifting device and used for extracting low value components such as, for example, mobile homes, etc., were examined, but found to have undesirable limitations. For example, one automated system that was examined utilized a lifting device which provided automated centering utilizing a pendulum or gimbal-type sensor device in conjunction with manual control. Such device, extracted using a single hook assembly, however, required significant deviation in the leveling of the component to be lifted prior to attempting to properly center itself above the component to be lifted. Further, such device did not provide either redundant control systems or a multi-level safety control system, or even adequate automated visual means of indicating an out of tolerance condition.

Recognized therefore by the Applicants is the need for a system, apparatus, program product, and method for safely lifting and stabilizing high-value components or modules such as aircraft modules that can be used universally across different versions having different centers of gravity, and which can, for example, provide accurate load level sensing, redundant control, and multi-level safety features.

SUMMARY OF THE INVENTION

In view of the foregoing, embodiments of the present invention advantageously provide an adjusting load bar system, apparatus, program product, and method for safely lifting and stabilizing high-value components or modules such as aircraft modules, that includes an adjusting load bar control system which, for example, utilizes electronic tilt sensors, compact industrial computers, direct current pulse width modulation motor drives, absolute position feedback encoders, direct current motors, linear screw drive actuators and a custom software package controlled through a mobile control cart having touch screen with a graphical user interface.

Embodiments of the present invention advantageously provide a universal automated adjusting load bar apparatus which can eliminate the need for multiple dedicated center of gravity point lift-type load bars, and which can provide an integrated multi-level safety control "watch" system. Such apparatus can include instrumentation, controls and linear drive units interfaced with a carriage-frame-spreader bar assembly to provide the necessary power and system control to adjust a crane lift point relative to a spreader bar in two horizontal axes. A two axis linear drive system can transfer a moveable frame type carriage with attached four way lifting sling for making necessary center of gravity lift point corrections when non-level conditions exist.

More specifically, according to an embodiment of the present invention, the adjusting load bar apparatus can include a spreader bar assembly adapted to connect to and carry an aircraft or other high-value module, a mechanical drive unit including a first frame connected to a spreader bar assembly and a second frame slidably connected to the first frame, a carriage slidably connected to the second frame, with the first and the second frames providing position adjustments for the carriage in X and Y directions. Each frame includes a pair of longitudinal frame beams, a pair of lateral frame beams, a pair of rollers, and roller guides extending along each respective longitudinal frame beams to allow the slidable movement. The longitudinal beams of the mechanical drive unit can extend beyond the length of the spreader bar assembly in order to enhance utilization of rotational inertia.

To stabilize such movement, each frame also includes a pair of drive screws extending between lateral frame beams, each driven by a direct current (DC) motor (e.g. conventional pulse width modulated DC motor or stepper motor, etc.), which allows precision positioning of the second frame with respect to the first frame and the carriage with respect to the second frame. The second frame includes a pair of threaded drive screw guides in each longitudinal frame beam, which receive the pair of first frame drive screws. Correspondingly, the carriage includes a pair of threaded drive screw guides in each longitudinal frame beam, which receive the pair of second frame drive screws. A lifting sling includes a plurality of angularly spaced apart sling legs, e.g., four, each separately connected at one end to a connector positioned adjacent a corner of the carriage and at the other end to an apex loop adapted to interface with an overhead carrying device such as, for example, a lifting crane, to provide an interface between the apparatus and the overhead carrying device.

The mechanical drive unit also includes or otherwise carries an adjusting load bar control system which includes a plurality of robot (e.g., programmable logic) controllers each positioned to interface with one or more tilt sensors, servo amplifiers, encoders, and DC motors to position the carriage in proper juxtaposition to the center of gravity of the combination of the mechanical drive unit, spreader bar assembly, and aircraft module, to thereby stabilize the aircraft module during lifting and transport. The first and second robotic controllers include memory and at least a portion of a drive unit stabilizing program product stored in the memory and including instructions to perform the operation of deriving a control signal to drive the DC motors to automatically position the carriage at a proper juxtaposition with respect to the center of gravity to thereby dampen any rotational tendencies and stabilize the mechanical drive unit. The first and second robotic controllers can function independently to form redundant mechanical drive systems.

A third robotic controller can both monitor the sensed data and the movement commands of the first and the second robotic controllers, and can monitor the resulting physical movements. If a movement command and the resulting movement does not match or if there is an out of tolerance mismatch between movement commands of the first and the second controllers, the control system, using the third robotic controller, can automatically detect this condition and shift into an emergency stop condition. This malfunction protection guards against loss of control such as, for example, a runaway drive due to mechanical, electrical or software problems. In addition to the internal automatic safety features, an additional level of manual protection has been included. This additional level of protection (additional human interaction feature) can include a spring loaded "Dead Man's Switch." The dead man's (a spring loaded hand held) switch can permit the operator to override all automatic systems, if needed, to result in a system movement halt, for example, by releasing the switch.

The level sensing of the adjusting load bar apparatus can be accomplished by using a plurality of electronic inclinometers (clinometers). The electronic inclinometer can allow for the condition/orientation of the module to be monitored. Feedback from the inclinometer on the levelness of the module can be used by the operator to control the transport of the module much more accurately, because the operator knows the exact condition of the module. The addition of feedback to the control system allows for a much more controlled lift. Thus, this allows for adjustments to be made much more precisely than conventionally capable. The feedback from the inclinometer allows the operator to adjust the load bar exactly to the center of gravity, within the resolution of the inclinometer. The resolution of the preferred inclinometers is 0.1 degrees of resolution.

The feedback from the inclinometers can also allow for a visual display of the module's condition to the operator. That is, the feedback can provide visual queues to notify the operator if the load is in or out of a level position. These visual cues can include two light stacks, at either side of the bar, with a green and red light. The lights are responsive to the feedback of the inclinometers and an acceptable tolerance applied to the lifting configuration. For example, if the module being lifted is required to be extremely level during its transfer, the apparatus has the ability to pick the module up within 0.25 degrees or, in other words, be out of level by up to 0.25 degrees. If the load is outside of the 0.25 degree tolerance, the red light is illuminated notifying the operator that the load needs to be adjusted. If the load is within the 0.25 degree tolerance, the green light is illuminated notifying the operator that the load is within the acceptable tolerance.

Embodiments of the present invention also provide a mobile cart which provides the operator interface which can be used to control the adjusting load bar apparatus for lifting and stabilizing high-value components or modules, e.g., aircraft modules, or other loads under an overhead crane or other overhead carrier device. The adjusting load bar in conjunction with the mobile cart can include/provide a redundant "multi-level safety control system" for safely and stably lifting and transporting such loads when positioned under the overhead crane or other overhead carrier device. Particularly, the mobile cart can provide an additional level of protection through a human interaction feature, such as, for example, a spring loaded "Dead Man's Switch." The dead man's switch can permit the operator to override all automatic systems, if needed, to result in a system movement halt, for example, by releasing the switch. The mobile cart can also provide a display screen to allow the operator to select from a set of preset tolerances, e.g., 0.25 degrees, 0.5 degrees, 0.75 degrees, and 1.0 degree, for the lift capability. The mobile cart and the adjusting load bar can each be entirely self-powered, making the entire apparatus self-powered.

According to embodiments of the present invention, the system includes drive unit stabilizing software/program product, which can include both operator station and controller software/program product. The controller software/program product includes, for example, modules which include instructions to perform the operation of deriving a control signal to drive the DC motors to position the carriage at a proper juxtaposition with respect to the center of gravity to thereby dampen any rotational tendencies and stabilize the mechanical drive unit. These instructions, when executed separately by each of the controllers, allows the respective controller to perform the operations of receiving X and Y tilt data from an associated one or more inclinometers or gyros, receiving or accessing preselected tilt tolerances and current positioning of the drive screws to calculate the center of gravity of the load and the number of rotations of the DC motors necessary to position the carriage in the proper juxtaposition with the center of gravity. Note, the load includes the load bar apparatus, spreader board assembly, module, etc. The third controller, however, rather than drive servo amplifiers, can drive emergency stop hardware. The third controller program product, therefore, also includes instructions to perform the operation of ordering an e-stop if there is either a mismatch between the output instructions (position values) of either of the first and second motion controllers, or if there is a mismatch between expected and actual physical conditions such as when there is an over or undershoot.

The operator station program product can include both standard PC type software and embedded controller software. The operator display, preferably provides a Visual Basic-based graphical user interface. The operator station program product includes instructions to perform the operations of providing a sign-in screen which includes inputs that allow the operator to select and generate communication messages to set proper tilt limits.

The instructions also include those to perform the operation of providing an XY screen to display X, Y, pitch, and roll, to display commanded X and Y along with their respective error, to allow the operator to change commanded X and Y positions by a preset limit using a displayed screen joystick and communicate such changes to the controller program product. The instructions also include those to perform the operation of providing a tilt screen to display X, Y, pitch, and roll, to display commanded pitch and roll along with their respective error, to allow the operator to change commanded pitch and roll positions using the displayed screen joystick and communicate such changes to the controller program product. This is useful, for example, in order to align the load with pins or other assemblages, as described previously. The instructions also include those to perform communication operations between the cart and the adjusting load bar control system.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art.

In the Aerospace and other vehicle or component production industries, for example, numerous assembly station moves with different component weights and center of gravity (CG) configurations exist. Embodiments of the present invention provide an adjusting load bar apparatus for lifting and stabilizing high-value components or modules, e.g., aircraft modules, or other loads under an overhead crane or other overhead carrier device. Beneficially, embodiments of the apparatus can be used within, for example, the Aerospace Manufacturing industry to lift and transport, for example, a partially or fully assembled F-35 forward fuselage in each of a plurality of variants, e.g., three (CTOL, CV, and STVOL), Wing, and Canopy IPTs, in various production stages resulting in different center of gravity locations. Such apparatus can include/provide a redundant "multi-level safety control system" for safely and stably lifting and transporting such loads when positioned under the overhead crane or other overhead carrier device. According to a preferred embodiment, such apparatus beneficially can meet IEC 61508"Safety Integrity Level 4" guidelines for design safety due to the possibility of inadvertent movement of a suspended load in the close vicinity of workers. Note, although referring to high-value aircraft and vehicle components, embodiments of the apparatus can be readily employed for use in lifting both high-value and low value components, Aerospace vehicle or otherwise.

Figure 1:
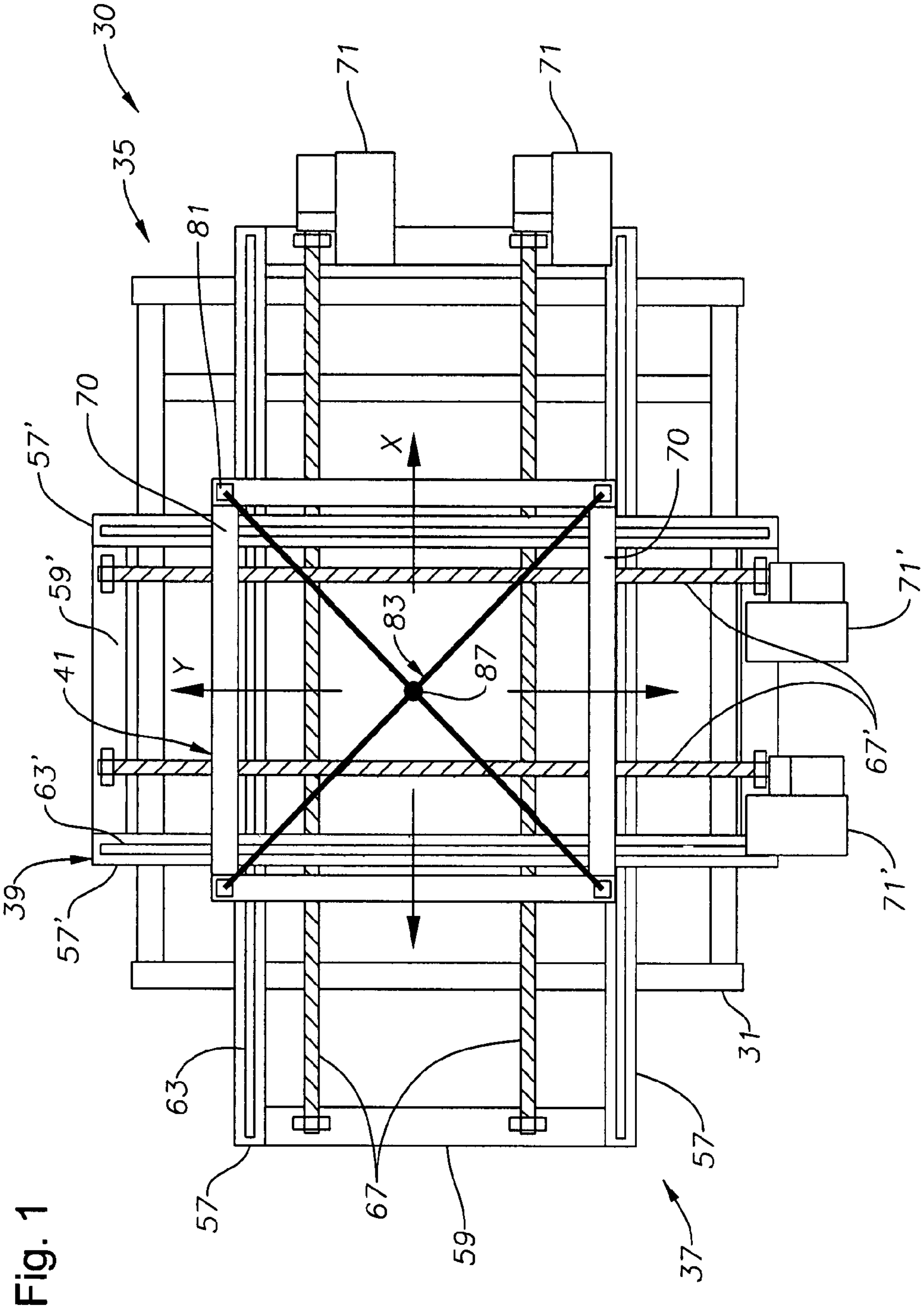
FIG. 1 is a top plan view of an apparatus for lifting and stabilizing high-value components or modules according to an embodiment of the present invention.
Figure 2:
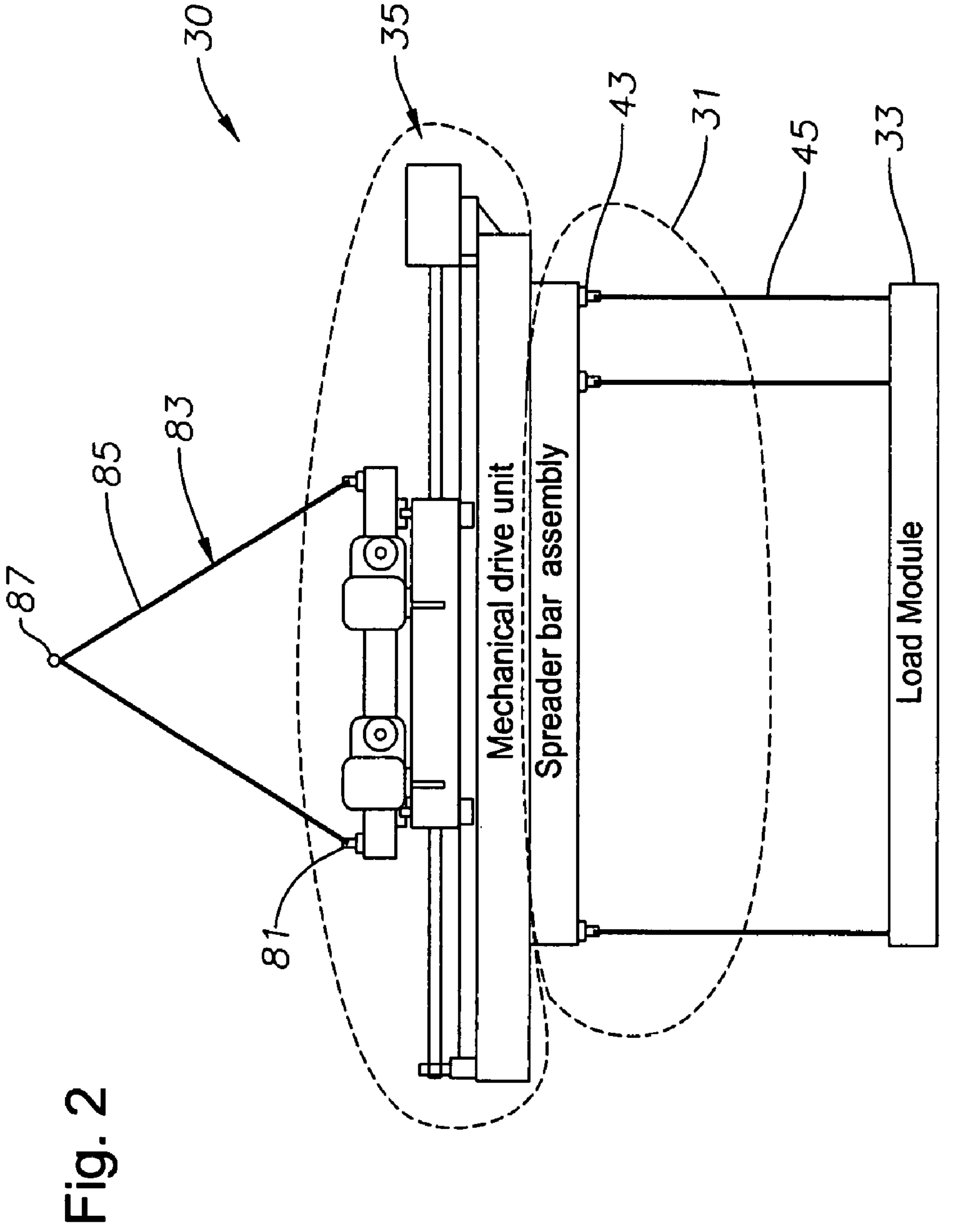
FIG. 2 is a perspective view of an apparatus for lifting and stabilizing high-value components or modules according to an embodiment of the present invention.

As shown in FIGS. 1 and 2, according to an embodiment of the present invention, the adjusting load bar apparatus 30 can include a spreader bar assembly 31 adapted to connect to and carry, for example, an aircraft or other high-value module 33, a mechanical drive unit 35 including a first frame 37 connected to the spreader bar assembly 31 and a second frame 39 slidably connected to the first frame 37, a carriage 41 slidably connected to the second frame 39, the first and the second frames 37, 39, providing position adjustments of the carriage in X and Y axis directions, and a redundant control system for providing the stability and leveling control.

The spreader bar assembly 31 is a rectangular steel framework structure adapted to be detachably connected to and supported by the mechanical drive unit 35. The spreader bar assembly 31 includes a plurality of lift points 43, e.g., typically six, and a plurality of sling legs 45, e.g., typically six, having lengths such that when attached to the aircraft module 33, the spreader bar assembly 31 will be parallel to the aircraft module 33. The spreader bar assembly 31 allows for accurate connection to predetermined fuselage/module attachment points (not shown) in two horizontal axes indicated as "X" and "Y." The vertical axis fuselage attachment points can be accomplished through calculations to determine the required sling lengths. The Fuselage Station (FS), Butt Line (BL) and Water Line (WL) data for each module or aircraft fuselage configuration can be predetermined such that the sling length calculations can be readily accomplished. Rather than directly connecting the adjusting load bar apparatus 30 to the module or fuselage 33, utilization of the spreader bar assembly 31 is preferred to help ensure that only planned load magnitude and load directions are induced into the fuselage or module 33 as a result of the lift.

The mechanical drive unit 35 is also a rectangular steel framework structure, frames 37, 39, carrying a two axes drive system including instrumentation (not shown), a fully self-contained direct current (DC) power source (battery) 53, controls and drive system 51 (FIGS. 3A-B) to provide real time positioning of the carriage 41 to maintain a level orientation of the mechanical drive unit 35 in a suspended load environment.

Each frame includes a pair of longitudinal frame beams 57, 57', a pair of lateral frame beams 59, 59', a pair of rollers or beams (not shown), and linear bearings/linear ball rails/guides 63, 63', extending along each respective longitudinal frame beams 57, 57', to allow the slidable movement. The longitudinal beams 57, 57', of the mechanical drive unit 35 can extend beyond the length of the spreader bar assembly 31 in order to enhance utilization of rotational inertia. To stabilize such movement, each frame also includes a pair of drive screws 67, 67', extending between lateral frame beams 59, 59', each driven by a DC motor 71, 71' or other form of, e.g., linear drive, which allows precision positioning of the second frame 39 with respect to the first frame 37 and the carriage 41 with respect to the second frame 39. The second frame 39 includes a pair of threaded drive screw guides (not shown) in each longitudinal frame beam 57', which receive the pair of first frame drive screws 67'. The linear drive screws 67, 67', are self-locking in place when power is removed such that they cannot be back driven, and are to be covered with flexible fabric bellows to provide protection and prevent contamination.

Correspondingly, the carriage 41 includes a pair of threaded drive screw guides (not shown) in each longitudinal frame beam 70, which receive the pair of second frame drive screws 67'. The carriage 41 is a relatively strong square or rectangular frame structure, which can absorb the horizontal components of the load. The carriage 41 includes a plurality of connectors 81 positioned adjacent each corner of the carriage 41.

A lifting sling 83 includes a plurality of angularly spaced apart sling legs 85, e.g., four, each separately connected at one end to one of the carriage connectors 81 and at the other end to an apex loop 87 adapted to interface with an overhead carrying device such as, for example, a lifting crane/crane hook (not shown) to provide an interface between the apparatus 30 and the overhead carrying device. The lifting sling legs 85 and spreader bar sling legs 45 are preferably woven fabric slings, e.g., nylon, having a two inch wide two-ply construction minimum, but can be alternatively constructed from other materials known to those skilled in the art including flat woven nylon or polyester. The spreader bar sling legs 45, in combination, should be able to support, for example, at least a 4,000 pound aircraft module 33. The lifting sling 83 should be able to support at least approximately 7,000 pounds.

Figure 3A:
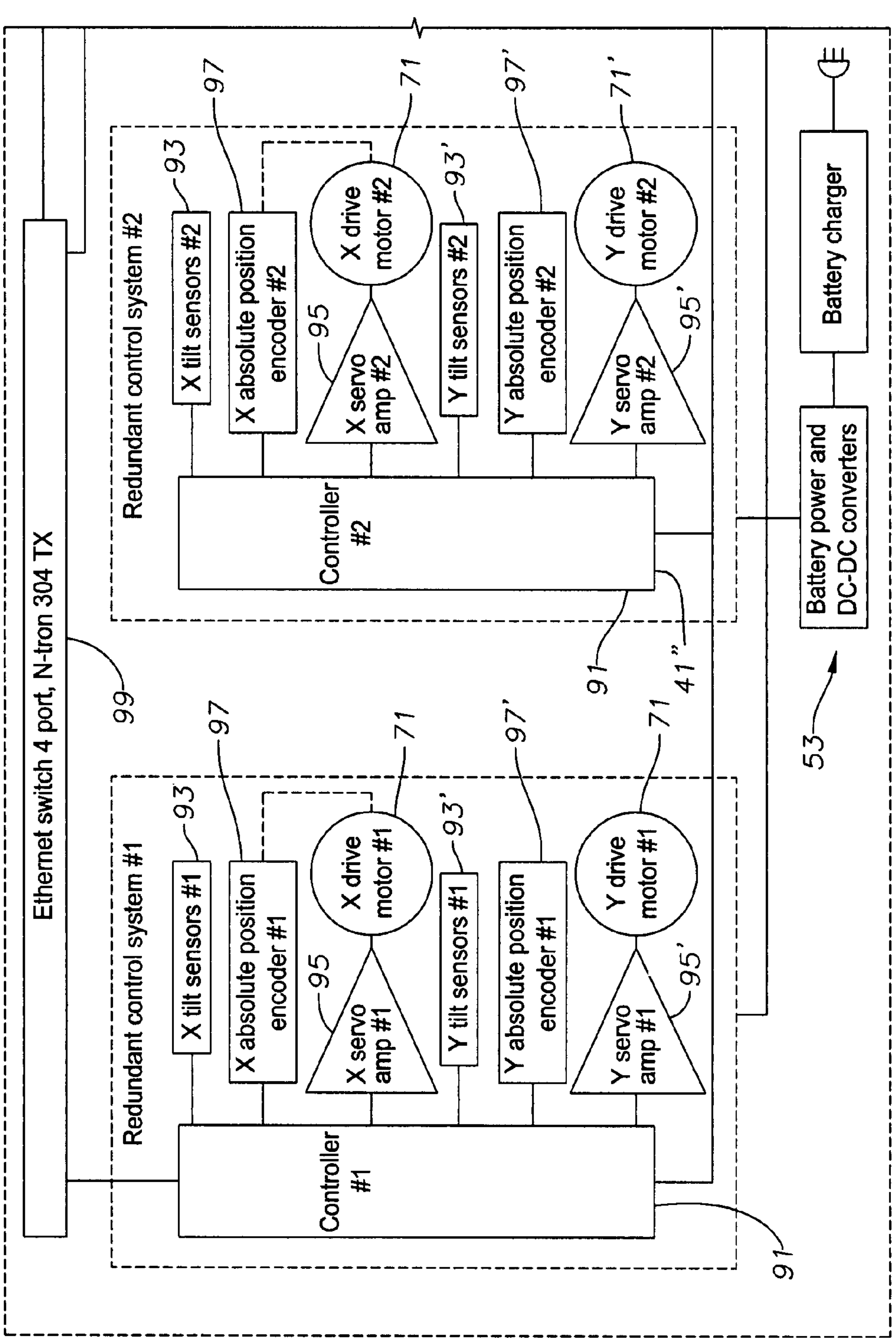
FIG. 3A-B is a schematic diagram of a control system for an apparatus for lifting and stabilizing high-value components or modules according to an embodiment of the present invention.
Figure 3B:
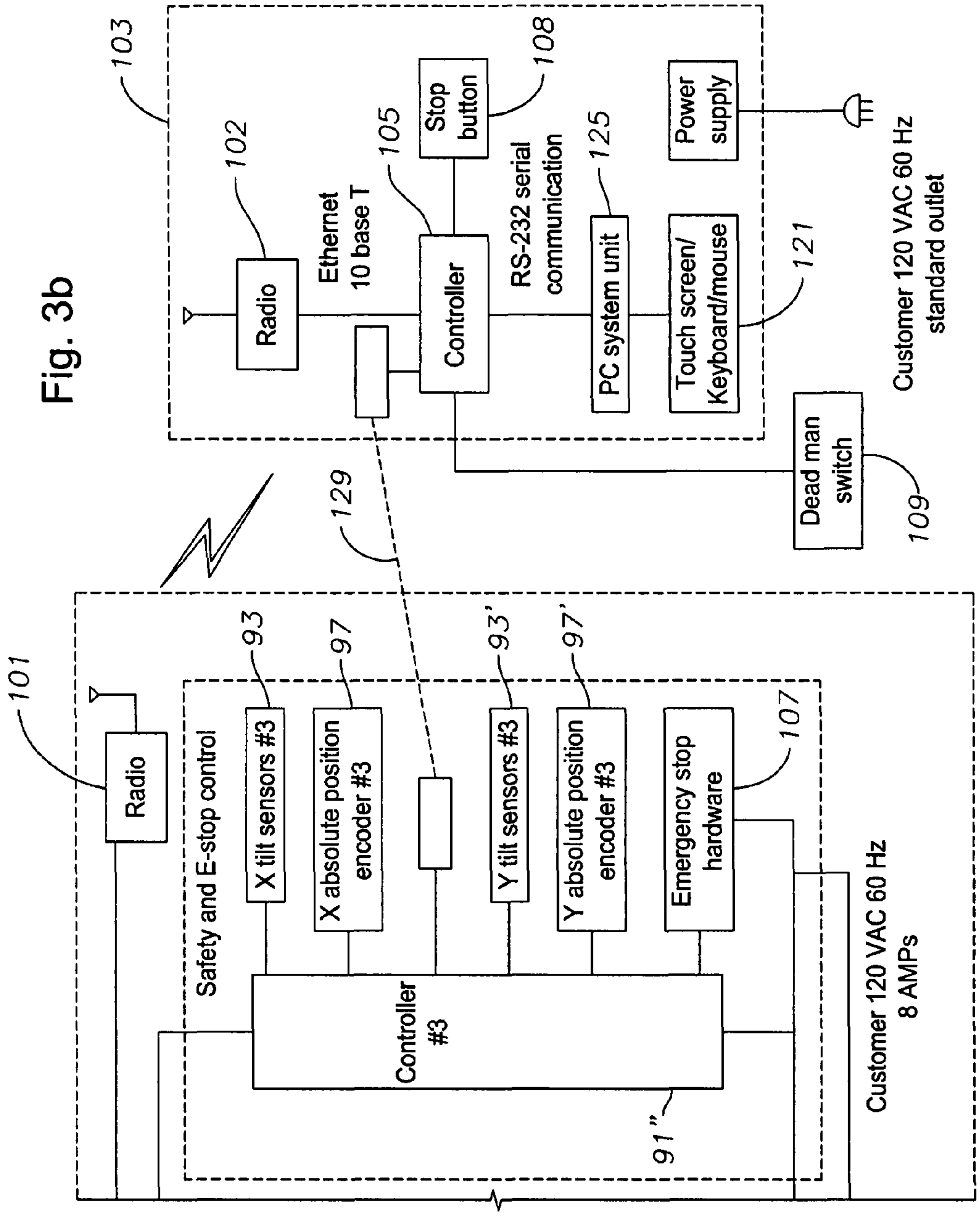
Figure 4:
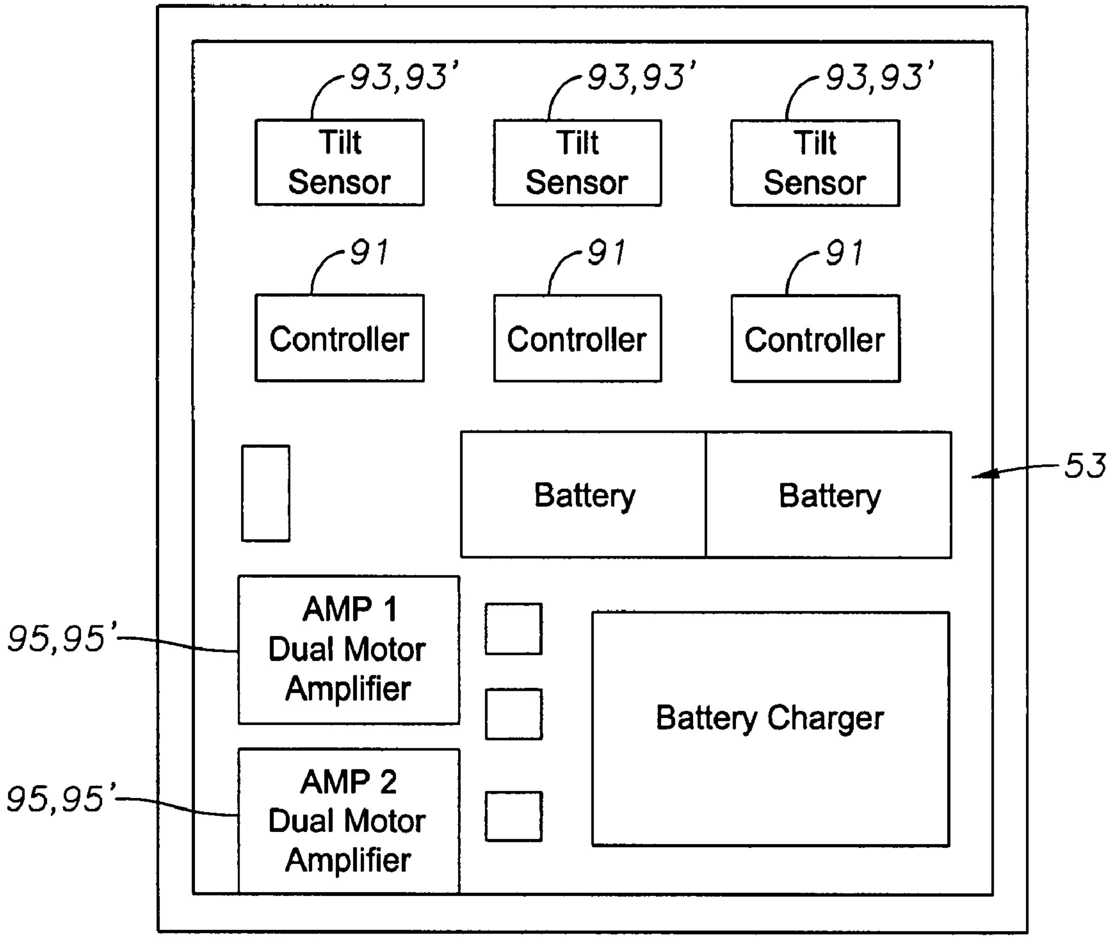
FIG. 4 is a schematic diagram of a portion of the control system of FIG. 3A according to an embodiment of the present invention.

As shown in FIGS. 3A-B and 4, according to the preferred configuration, the mechanical drive unit 35 also includes or otherwise carries an adjusting load bar control system 51 which includes three robotic (e.g., programmable logic) controllers 91, 91', 91" each positioned to interface with one or more X and Y tilt sensors 93, 93' (FIGS. 3A-B), or duel X & Y tilt sensors 93, 93' (FIG. 4), servo amplifiers 95, rotary absolute position encoders 97, 97', and DC motors 71 to position the carriage 41 in proper juxtaposition to the center of gravity of the combination of the mechanical drive unit 35, spreader bar assembly 31, and aircraft module or other item 33 to be carried, to thereby stabilize the aircraft module or other item 33 during lifting and transport. Each of the controllers 91, 91', 91", can be in the form of a programmable microprocessor based modular unit capable of receiving analog and/or digital input signals from external sources, such as sensors, and capable of processing such input signals to provide analog and/or digital output signals. The output signals include those usable for switching functions and, for example, square wave pulse width modulation motor speed control. Each controller 91, 91', 91", also is capable of being powered by a self-contained direct current source such as, for example, a sealed rechargeable battery 53. In the preferred configuration, each controller 91, 91', 91", is in communication with an Ethernet 99. Either of the controllers 91, 91', 91", but preferably the third controller 91" can provide a signal through a wireless network interface 101 to a ground-based monitoring cart 103 having a corresponding receiver 102, described later.

Figure 5:
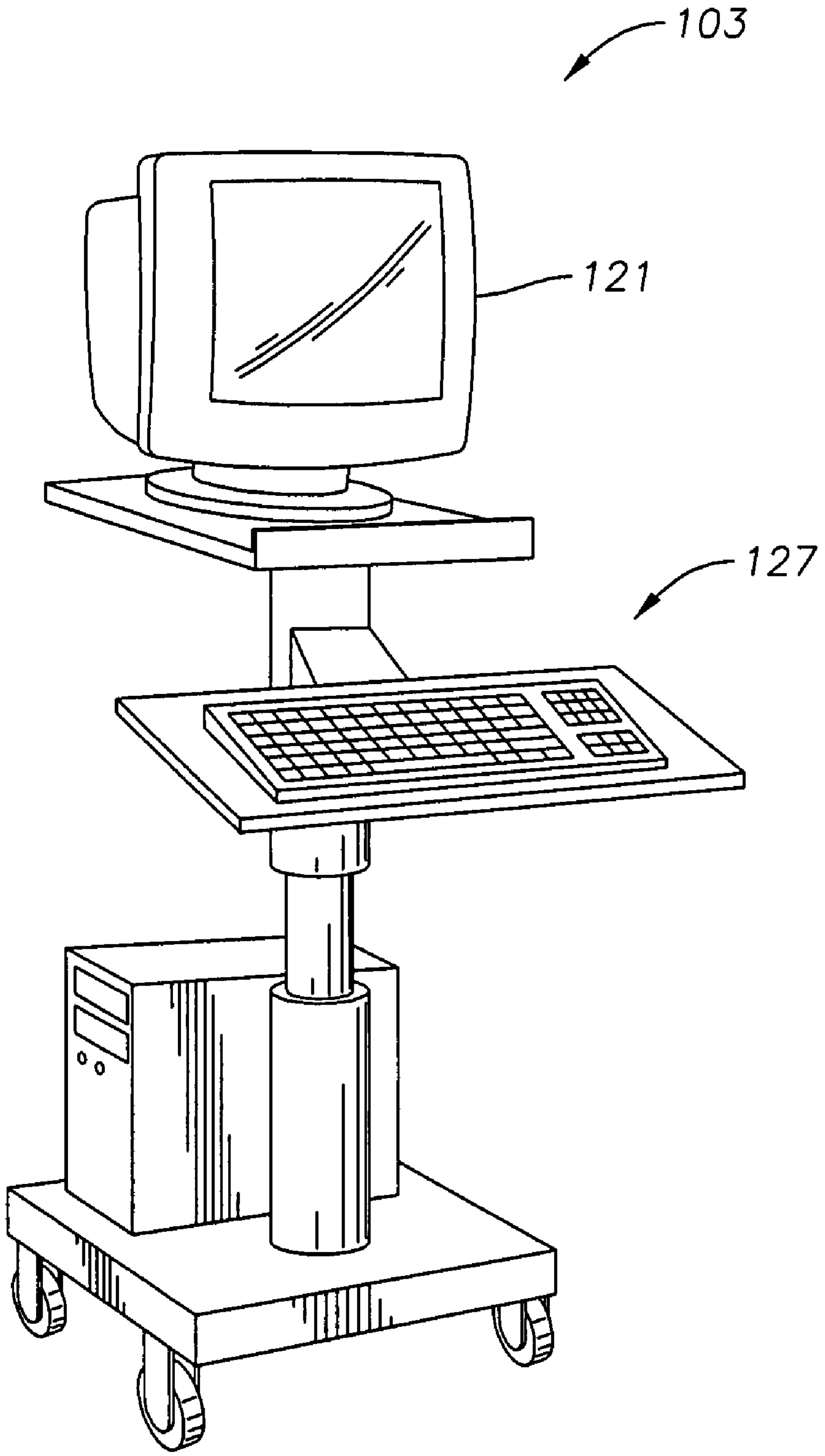
FIG. 5 is a perspective view of a control cart for lifting and stabilizing high-value components or modules according to an embodiment of the present invention.
Figure 6A:
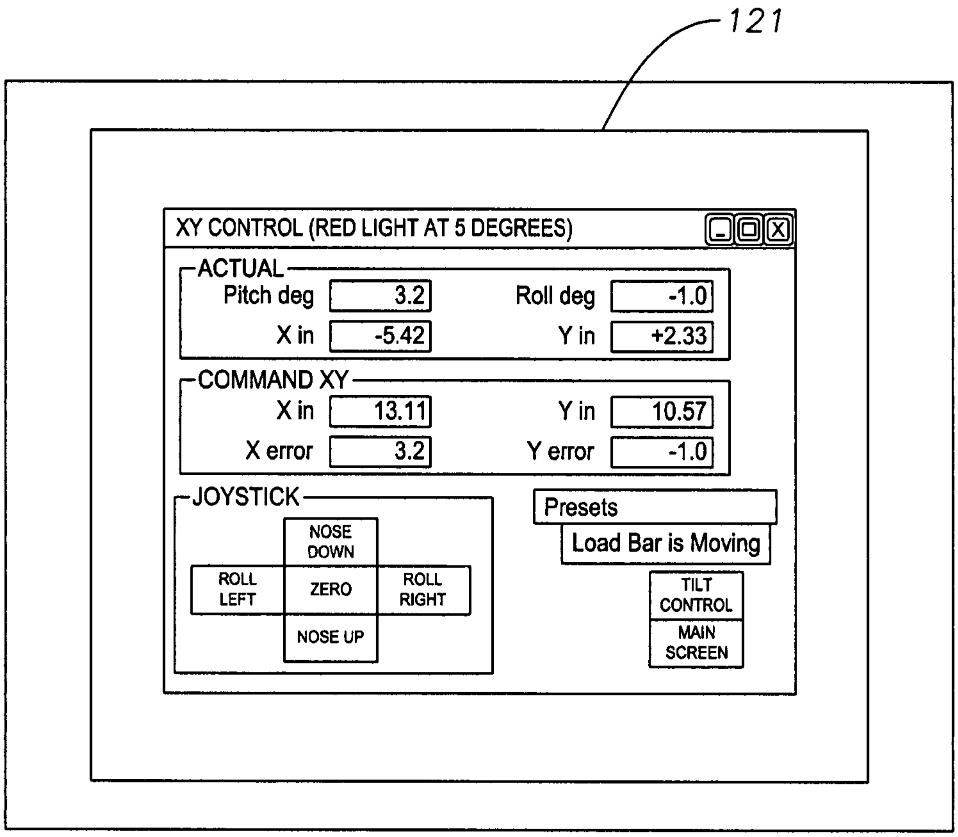
FIG. 6A-C are schematic diagrams of the front, back, and side of a display for a cart for lifting and stabilizing high-value components or modules according to an embodiment of the present invention.
Figure 6B:
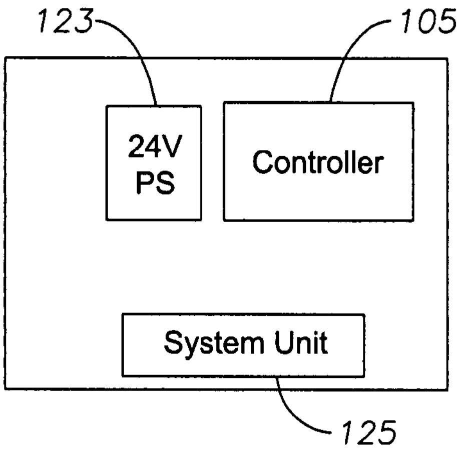
Figure 6C:
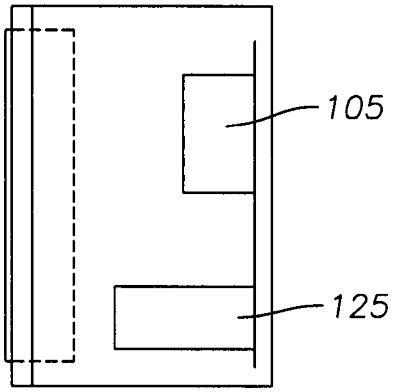

The first and second controllers 91, 91', can include the memory (not shown) and at least a portion of a drive unit stabilizing program product 111 (FIG. 7) stored in the memory and including instructions to perform the operation of deriving a control signal to drive the DC motors 71, 71' to position the carriage 41 at a proper juxtaposition with respect to the center of gravity of the module 33 to thereby dampen any rotational tendencies and stabilize the mechanical drive unit 35. The first and the second controllers 91, 91', each determine the composite center of gravity for the load (module) 33 suspended below the crane hook (not shown) and position of the movable carriage 41 such that the suspended load (module) 33 is parallel to, for example, the factory floor. Note, the tolerance for the term parallel can be defined by the operator to be within a predetermined angle relative to true level. This can be accomplished through a user interface 121, 127 (FIG. 5) or through accessing a module configuration database in communication with the mobile cart controller 105. Note, although in the preferred configuration, the angular tilt setting is adjustable; it is preferably not readily accessible to the operator. A key-type override (not shown) can be included to provide for inadvertent reset protection.

A third robotic controller 91" can be used to further maintain redundancy and can both monitor the sensed data and the movement commands of the first and the second controllers 91, 91', along with the resulting physical movements. If a movement command and the resulting movement does not match, the control system 51, using the third controller 91", can automatically detect this condition and shift into an emergency e-stop condition using, for example, emergency stop hardware 107 (relay, switch, etc.) to interrupt power to the motors 71, 71'. This malfunction protection guards against loss of control such as a runaway drive due to mechanical, electrical or software problems. This can also be accomplished by the operator at the mobile cart 103 using a manual e-stop button 108.

In addition to the internal automatic and manual safety features, according to an embodiment of the apparatus 30, an additional level of manual protection can be included. This additional level of protection (additional human interaction feature) can include a “Dead Man’s Switch” 109. The dead man’s switch (e.g., a spring loaded hand held switch) 109 can permit the operator to override some or all automatic systems (depending on the configuration), if needed, to result in a system movement halt by merely releasing the switch 109, controlling all necessary relays or internal controller switches for stopping the lift system motorized drives 71, 71' and/or 95, 95'.

According to embodiment of the apparatus 30, the first and second controllers 91, 91', can function independently to form redundant mechanical drive systems having independent drive movement commands, which can be compared so that if they are not within a preset allowable variance, the system 51, typically through use of the third controller 91", can automatically be placed into standby or e-stop mode to guard against a control system failure resulting in erratic operation or a runaway drive. Note, in an alternative two-controller only embodiment, each controller 91, 91', can instead compare command signals to that of the other controller 91, 91' to determine if a mismatch occurs. Further alternatively, one of the controllers 91, 91', can be configured to be a master, the other controller 91, 91', a slave.

The following tables in conjunction with FIGS. 3A-B indicate the various states of each of the controllers according to an exemplary configuration:

| Controller #1 and #2 Main Task States |
|---|
| 1 E-stop State |
| Comptroller Contractor open, no power to amplifier<br>Go to stop only on receipt of reset message from safety controller<br>Set tilt limits to minimum, commanded tilt to 0, commanded XY to 0 |
| 2 Stop State |
| Contactor closes, but amplifier is in idle (no power to motor)<br>Processes any new commanded tilt and commanded XY messages<br>Go to RunXY or Run Tilt on receipt of RunXY or RunTilt message |
| 3 RunXY |
| Motor is activated.<br>Carriage moves to target X an Y positions synchronized by safety controller<br>Independently check the synchronizing commands versus the original message<br>Independently check tilt limits<br>Go to stop or E-stop if commanded or internally decided |
| 4 Run Tilt |
| Motor is activated<br>System moves to target tilt synchronized by safety controller<br>Independently check the commands versus the original message.<br>Independently check tilt limits<br>Go to stop or E-stop if commanded or internally decided |

| Controller #3 Main Task States |
|---|
| 1 E-stop State |
| Controller Contactor open, no power to amplifiers<br>Go to stop only on receipt of reset message from 3 safety controller<br>Set tilt limits to minimum, commanded tilt to 0, commanded XY to 0 |
| 2 Stop State |
| Contractor closes<br>Processes any new commanded tilt and commanded XY messages go to RunXY or Run<br>Tilt on receipt of Run XY or RunTilt message |
| 3 RunXY |
| Synchronize commands to Motion 1 and Motion 2 controllers<br>Independently check position and tilt with separate sensors.<br>Go to stop or E-stop if commanded or internally decided |
| 4. Run Tilt |
| Synchronize commands to Motion 1 and Motion 2 controllers<br>Independently check position and tilt with separate sensors.<br>Go to stop or E-stop if commanded or internally decided |

The level sensing of the adjusting load bar apparatus 30 can be accomplished by using sensors 93, 93', in the form of, for example, electronic clinometers a.k.a. inclinometers, or gyros. Inclinometers are instruments for measuring angles of elevation, slope, or incline. The electronic inclinometers or other tilt sensors 93, 93', can allow for the condition/orientation of the mechanical drive unit 35/module 33 to be monitored. According to the preferred configuration, to enhance redundancy, each controller 91, 91', 91", is provided a signal from each of two separate single axis inclinometer sensors or a dual-axis inclinometer sensor to thereby develop control signals associated with the respective X and Y axes DC motors 71, 71'; and X and Y absolute position encoders 97, 97' associated with each respective X and Y drive motors 71, 71', servo amplifiers 95, 95', and drive screws 67, 67.

Feedback from the inclinometer or other tilt sensors 93, 93', on the levelness of the mechanical drive unit 35 (module 33) can allow the operator to better control the level of the module 33, because the operator knows the exact condition of the mechanical drive unit 35/module 33, real-time. The addition of feedback to the control system 51 also allows for a much more controlled lift. This can allow for adjustments to be made much more precisely than conventionally capable. The feedback from the inclinometers or other tilt sensors 93, 93', allows the operator to adjust precisely to the center of gravity, within the resolution of the inclinometer or other tilt sensors 93, 93'. The resolution of the preferred inclinometers is 0.1 degree of resolution.

The feedback from the inclinometers or other tilt sensors 93, 93', can also allow for a visual display to the operator of the condition of the mechanical drive unit 35 and module 33. That is, the feedback can provide visual and/or audible queues to notify the operator if the module (load mass) 33 is in or out of a level position, real-time. These visual cues can include two light stacks (not shown), at either side of the mechanical drive unit 35, with, for example, a green and a red light. The lights are responsive to the feedback provided by the inclinometers or other tilt sensors 93, 93', and an acceptable angular tolerance applied to the lifting configuration. For example, if the module 33 being lifted is required to be maintained in an extremely level condition during its transfer, the apparatus 30 has the ability to allow an operator to pick the module 33 up while maintaining a level condition within 0.25 degrees or, in other words, be out of level by a maximum of 0.25 degrees. If the module 33 is outside of the 0.25 tolerance, the red light, for example, can be illuminated to notify the operator that the load needs to be adjusted. If the load is within the 0.25 degree tolerance, the green light can be illuminated to notify the operator that the module 33 is within the acceptable tolerance.

As shown in FIGS. 5 and 6A-C, the apparatus 30 also includes a mobile cart operating station 103 which can include a color touchscreen monitor 121, embedded controller 105, uninterruptible power supply 123 (e.g., battery), system processor 125 (e.g., LittlePC system unit), keyboard with joystick or mouse 127, and client bridge 102 (e.g., wireless interface) to establish radio communication with the aerial portion of the adjusting load bar apparatus 30. An alternative communication cable 129 (e.g., the serial port cable) adapted to connect to, for example, the third controller 91, can also or alternatively be provided. The mobile cart 103 can also include the hand-held thumb-controlled dead man's switch 109 used to enable/disable automated operation of the adjusting load bar apparatus 30 by enabling and disabling continuous enabling transmissions. That is, releasing the dead man's switch 109 can function to interrupt a default signal authorizing the provision of power to the drive motors 71, 71', and/or servo amplifiers 95, 95', or causes a lack of signal, etc.

Figure 7:
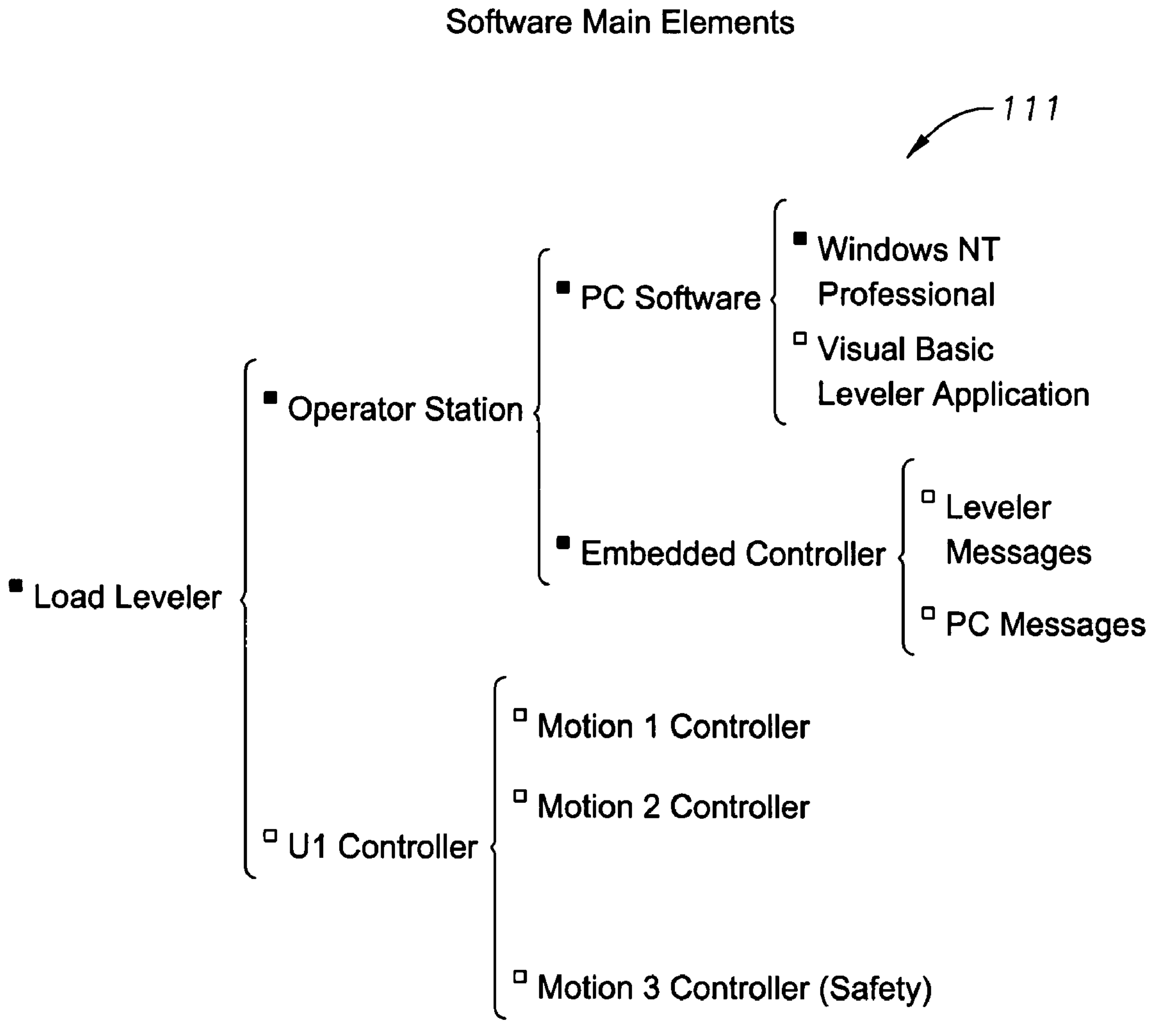
FIG. 7 is a schematic diagram of high-level software components for drive unit stabilizing software according to an embodiment of the present invention.
Figure 8:
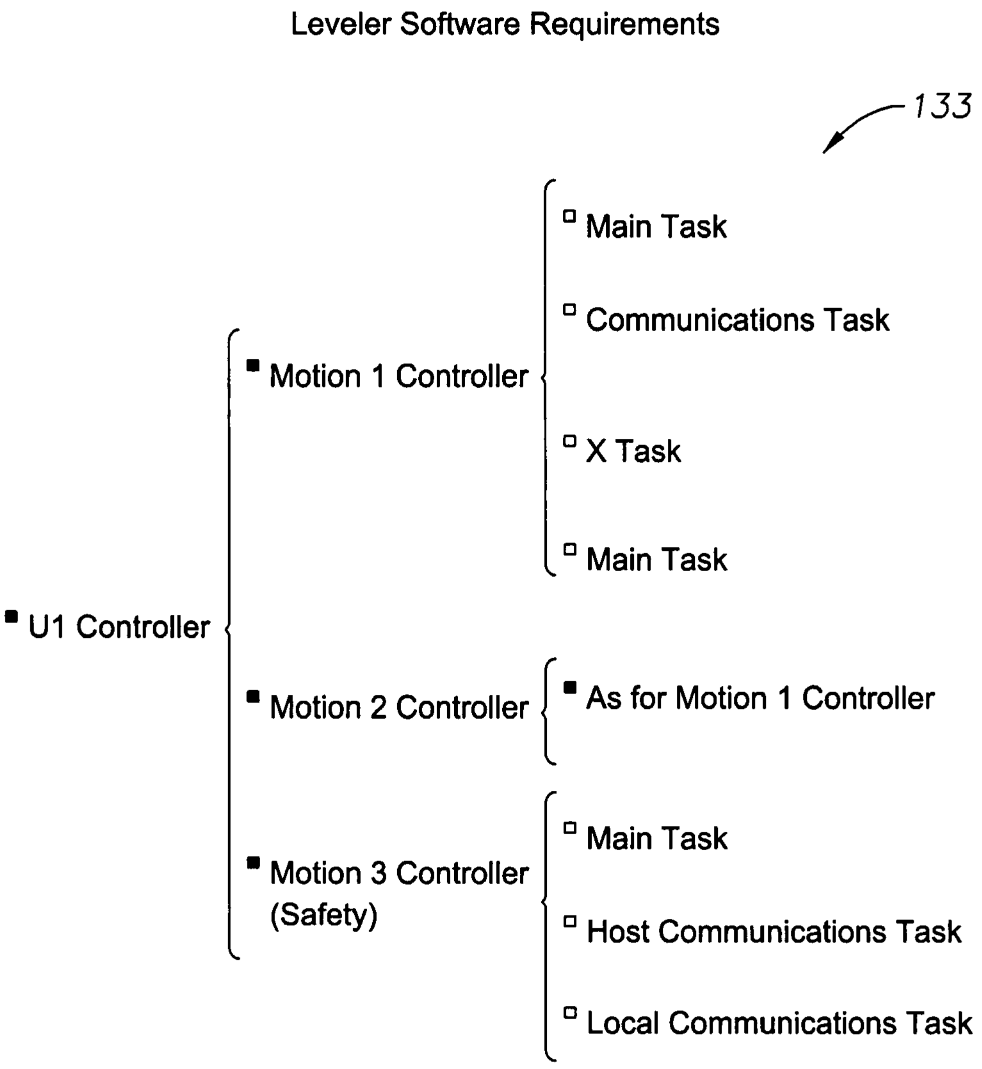
FIG. 8 is a schematic diagram of controller software according to an embodiment of the present invention.

As perhaps best shown in FIGS. 7-11, according to embodiments of the present invention, the apparatus 30 includes drive unit stabilizing software/program product 111 including both operator station 131 (FIG. 9) and controller software/program product 133 (FIG. 8). As shown in FIG. 8, the controller software/program product 133 includes modules which include instructions to perform the operation of deriving a control signal to drive the DC motors 71, 71', to position the carriage 41 at a proper juxtaposition with respect to the operation center of gravity to thereby dampen any rotational tendencies and stabilize the mechanical drive unit. These instructions, when executed separately by each of the controllers 91, 91', allows the respective controller 91, 91', to perform the operations of: receiving X and Y tilt data from an associated one or more inclinometers, gyros or other sensors 93, 93'; receiving or accessing preselected tilt tolerances; and receiving or accessing current positioning of the drive screws 67, 67', to calculate the center of gravity of the module (load) 33 in conjunction with that of the mechanical drive unit 35 and spreader for assembly 31, to thereby calculate the number of rotations of the DC motors 71, 71', necessary to position the carriage 41 in the proper juxtaposition with the center of gravity of the module 33. Note, the module 33 (load) in this exemplary embodiment includes the adjusting load bar apparatus 30, spreader bar assembly 31, module 33, etc. Other combinations are within the scope of the present invention.

As perhaps best shown in FIG. 3A, the third controller 91", however, rather than drive servo amplifiers 95, 95', can drive the emergency stop hardware 107. The software/program product residing on the third controller 91", therefore, also can include instructions to perform the operation of ordering an e-stop if there is either a mismatch between the output instructions (position values) of either of the first and second motion controllers 91, 91', or if there is a mismatch between expected (calculated) and actual (observed) physical conditions such as when there is an over or undershoot.

Figure 9:
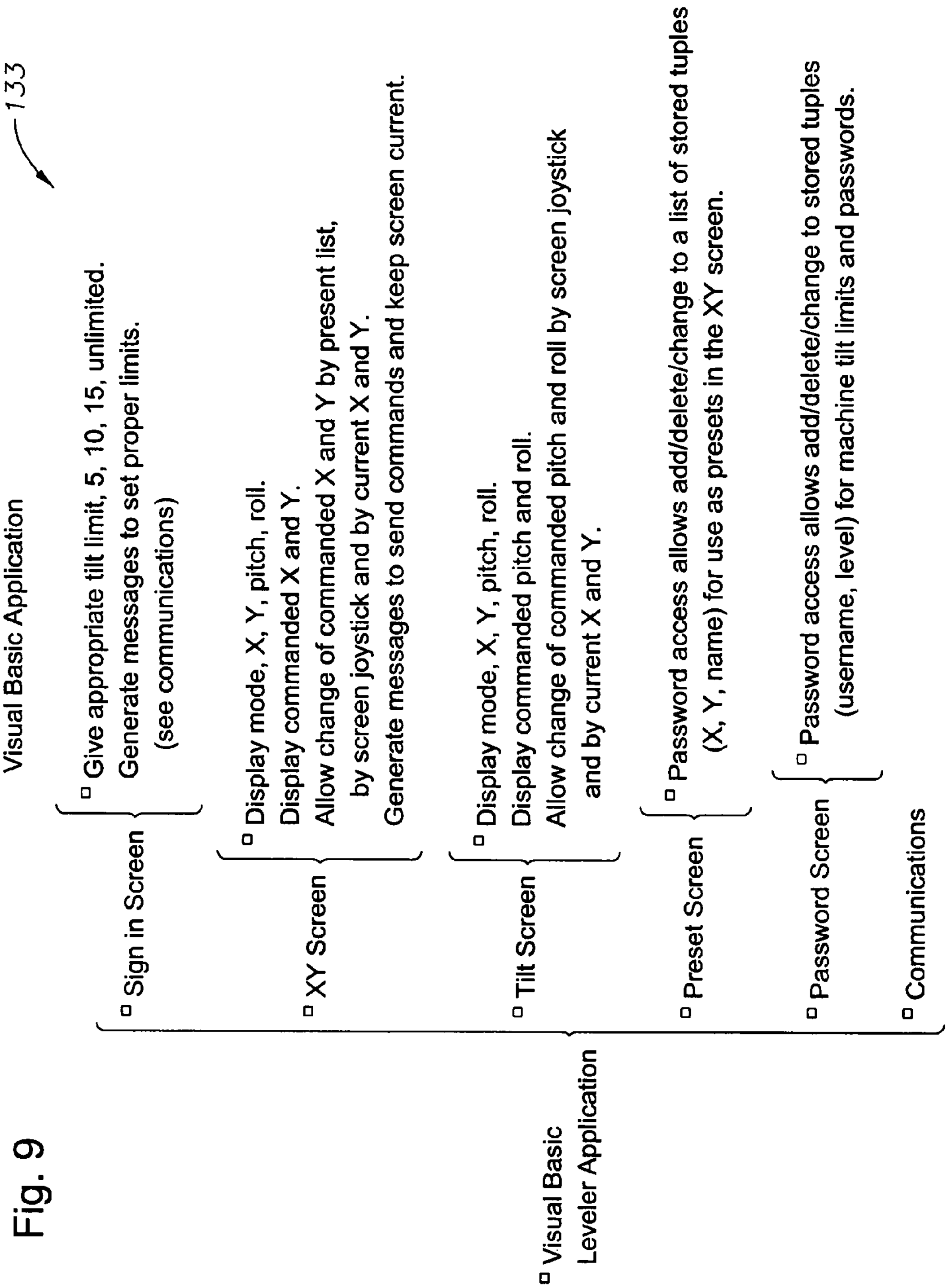
FIG. 9 is a schematic diagram for operator station software according to an embodiment of the present invention.
Figure 10:
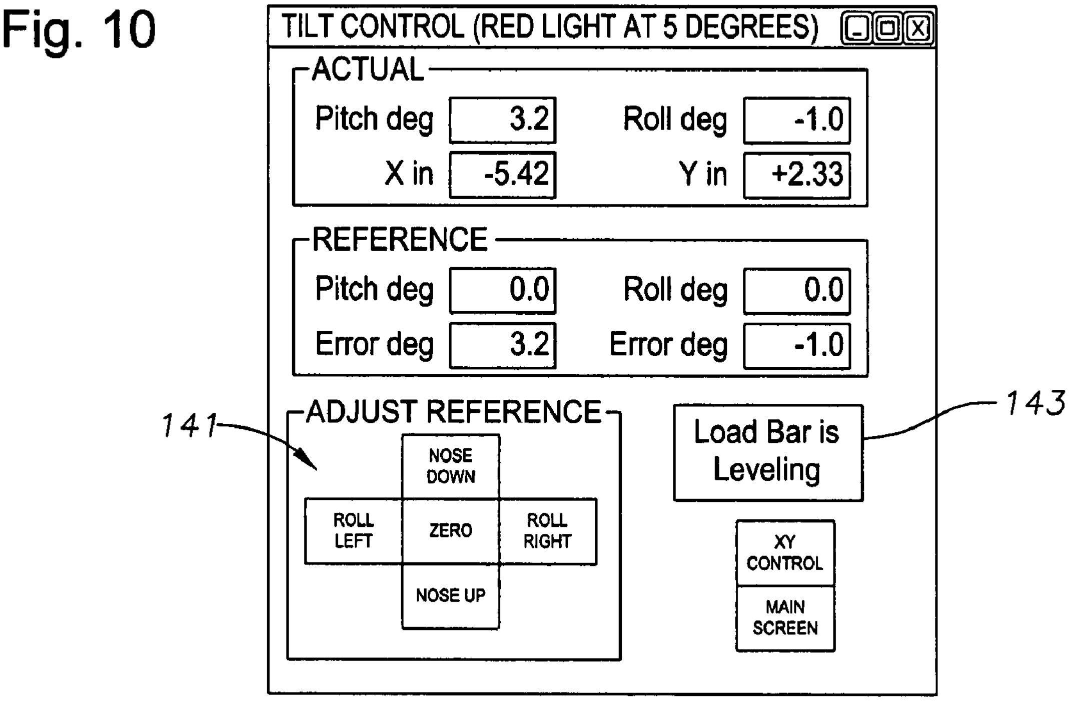
FIG. 10 is a graphical user interface for providing tilt control according to an embodiment of the present invention.

As shown in FIGS. 7 and 9, the operator station program product 131 can include both standard PC type software and embedded controller software. As perhaps best shown in FIGS. 9-11, the operator display 121, preferably provides a Visual Basic-based graphical user interface. The operator station program product 131 also can include instructions to perform the operations of providing a sign-in screen, which can include inputs that allow the operator to select and generate communication messages to set proper tilt limits. A login screen displayed on the mobile cart computer display 121 can be the first one to appear on power up. This screen, according to the exemplary configuration, allows sign-on to one of the following preselected conditions:

1. Level with 5 degrees of tilt error before the red light comes on.
2. Level with 10 degrees of tilt error before the red light comes on.
3. Level with 15 degrees of tilt error before the red light comes on.
4. Unlimited operation, allowing changing of tilt references, presets and setting of error; and
5. Password add/delete change After entry of an authorized password, the screen shown in FIG. 10 can be displayed for selection 1 through 4, above. The "adjust reference controls" section 141 will normally only appear if the unlimited log in was used. Whenever this screen is displayed and the dead man switch 109 is pressed, the motors 71, 71', will operate so as to zero the error between the "reference" tilt and the "actual" tilt. Notably, color of the status box 143 can be configured to display color switch match the RED/GREEN stack lights on the mechanical drive unit 35, and can include an ability to flash when the dead man's switch 109 is not being pressed, as can the light stack lights. A preset-edit screen (not shown) can be provided to allow the addition, change and deletion of preset positions. According to the exemplary embodiment, the presets generally have three parameters each:

1. Name of the preset;
2. X coordinate value; and
3. Y coordinate value.

Figure 11:
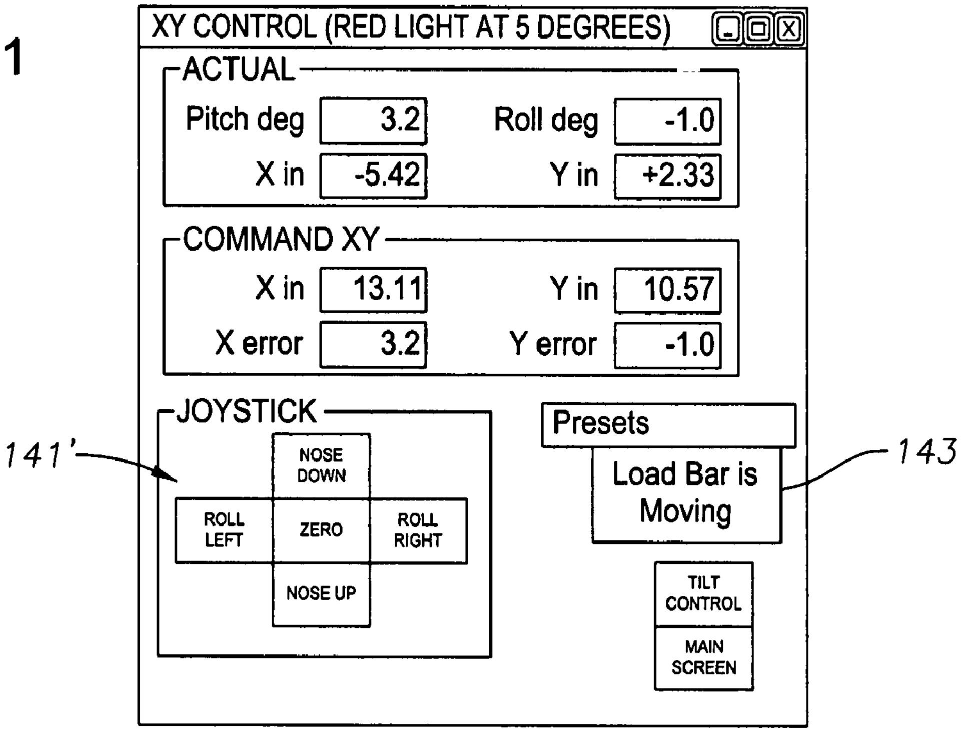
FIG. 11 is a graphical user interface for providing location control according to an embodiment of the present invention.

If the XY screen shown in FIG. 11 is selected, the motors 71, 71', can be commanded to new X and Y positions. This can be from presets or by pressing the screen joystick buttons displayed in the joystick section 141'. The motors 71, 71', will not move to achieve the new position unless the dead man's switch 109 is pressed.

Correspondingly, the instructions can also include those to perform the operation of providing the XY screen (FIG. 11) to display X, Y, pitch, and roll, to display commanded X and Y along with their respective error, to allow the operator to change commanded X and Y positions by a preset limit using a displayed screen joystick 141', and communicate such changes to the controller program product 133. The instructions also include those to perform the operation of providing the tilt screen (FIG. 10) to display X, Y, pitch, and roll, to display commanded pitch and roll along with their respective error, to allow the operator to change commanded pitch and roll positions using the displayed adjust reference joystick 141 and communicate such changes to the controller program product 133. This is useful, for example, in order to align the load with pins or other assemblages, as described previously.

The instructions also include those to perform communication operations between the mobile cart 103 and the adjusting load bar control system 51. Various examples of communication and ground-to-leveler messaging types, according to the exemplary embodiment, are provided in the following tables:

| Communication Message Types |
| --- |
| Message formats, human readable, PC is master |
| Tx: Embedded ID PcID message # command contents<br>Rx: PcID Embedded ID message # reply<br>Pcld = 100<br>EmbeddedID = 200<br>LevellerID = 300<br>Get Position |
| Tx: 100 200 817 GetPosition<br>Rx: 200: 100 817 Mode = running Pitch = 3.1<br>Roll = −1.1 X = 21.4 Y = 13.1<br>Set Tilt Limit |
| Tx: 100 200 818 SetTiltLimit PitchLimit = 10.0 RollLimit = 9.0<br>Tx: 200 100 818 Okay<br>Get TiltLimit |
| Tx: 100 200 819 GetTiltLimit<br>Rx: 200 100 819 PitchLimit = 10.0 RollLimit = 9.0<br>Command Tilt |
| Tx: 100 200 821 Command XY Xcommand = −33 Ycommand = 5.2<br>Rx: 200 100 821 Okay<br>Command E-stop |
| Tx: 100 200 823 Reset<br>Rx: 200 300 823 Okay<br>Command Reset |
| Tx: 300 200 823 Reset<br>Rx: 200 300 823 Okay |

| Ground to Leveler Message Types |
| --- |
| Message formats, human readable, embedded controller is master<br>Command RunXY or RunTilt based on last command<br>(Run Tilt is default) |
| Tx: 300 200 317 RunXY<br>Rx: 200 300 317 Mode = running Pitch = 3.1 Roll = −1.1 X = 21.4<br>Y = 13.1 |

-continued

| Ground to Leveler Message Types |
|---|
| Command Stop |
| Tx: 300 200 318 Stop<br>Rx: 200 300 318 Mode = stopped Pitch = 3.1 Roll = 1.1 X = 21.4 Y = 13.1 |
| Command E-stop |
| Tx: 300 200 319 E-stop<br>Tx: 200 300 318 Okay<br>Plus relayed messages from PC, see message types above |

According to a preferred configuration, the adjusting load bar control system/drive unit stabilizing software/program product 111 provides three levels of operation. Level 1 operation provides the operator minimum necessary functions for basic lifting and moving of a module. Level 1 operation includes monitoring weight, angular position, and center of gravity of the suspended load 33 and self-adjusts to maintain level when in operational mode.

Level 2 allows both "Automatic" adjustment mode and "Manual" operation for mechanical drive unit 35. Level 2 operation includes a lock out with password protection. Operators can be assigned a password. Manual mode is accessible through adjust reference section 141/joy stick control 141', or operator adjustment of the suspended load, providing limited Forward-Aft (e.g., X axis) direction angular adjustment. This predetermined angular position movement is provided up to, for example, a ±10 degree angular tilt. This predetermined angular limit setting is also adjustable (with password protection), but generally should not be commonly accessible to the operator for making changes. In the Butt line (Y axis) direction, the tilt is limited to, for example, ±5 degrees. Optionally, Level 2 operation can provide "Center of Gravity" measurement in the Z axis.

Level 3 allows both "Automatic" adjustment and "Manual" operation. Level 3 operation also includes, for example, a locked out with password protection. Supervisors should only normally be assigned a password. Manual operation is accessible through joy stick control or operator adjustment of the suspended load, to allow the operator to adjust the angular tilt in two directions (X and Y) without limiting the angular tilt. The operator can be provided the capability of overriding all automatic controls and powering the carriage 41 to the extremes of its travel distance.

As described above, each level provides automatic center of gravity correction capability. Each level also provides a "Manual Step" mode where carriage positioning is to take place only in predefined steps, such as, for example, 1" movements of the carriage 41 through a momentary push button on the control panel (not shown) or momentary actuating touch screen button. The spring loaded "dead man's switch" 109 provides a safety feature. The ground based crane signal operator can hold the dead man's switch 109 and keep it engaged at all times when the mechanical drive unit 35 is permitted to make center of gravity position corrections.

It is important to note that while embodiments of the present invention have been described in the context of a fully functional system, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links.

For example, such media can include both operating instructions and instructions related to the drive unit stabilizing software/program product 111 described above and much of the method steps described above and below. A detailed exemplary operating procedure methods follows according to an embodiment of the present invention:

Start Up.

The following starting conditions are used by way of example: Arial portions of the adjusting load bar apparatus 30 hereinafter intermittently referred to as "the adjusting load bar" are stored on a storage rack (not shown), plugged into a 110 VAC outlet for charging the battery 123. The appropriate spreader bar assembly 31 is available in a work area for attachment. The adjusting load bar apparatus charge ON/OFF selector switch (not shown) is at ON; and the adjusting load bar apparatus power ON/OFF is at OFF (not shown). The operator plugs the mobile cart power cord into a 110 VAC outlet and turns the mobile cart power switch to ON. The operator then waits for the system to power up (e.g., normal Windows XP, etc.) and go to the first screen of the operator station software application. The operator then selects the desired level of operation: 5 degree, 10 degree, 15 degree, or unlimited, via touch buttons on startup screen, and enters the operator station password. If successful, the screen should show that there are no communications.

The operator then turns the adjusting load bar power switch from OFF to ON. The load bar GREEN stack light on the mechanical drive unit 35 should flash indicating level, but with linear drive motors 71, 71', inhibited. The screen should show communications are working. The operator then ensures that the, e.g., four-way adjustable lifting strap 83 is in good condition, not frayed and attached properly. The operator then pulls out the mobile cart E-Stop button 108 and presses and holds the mobile cart dead man switch 109 to allow leveling motion. The GREEN stack light should go solid (stop flashing). The operator then commands the carriage 41 to the desired X, Y coordinates in relation to the spreader bar assembly 31. This can be done by entering the coordinates manually, using the four touch button screen "joystick" 141', or selecting a preset from a list of screen cases. The operator then releases the dead man switch 109. The GREEN stack light should return to flashing.

Pick Up the Load Bar.

The operator turns the adjusting load bar charge ON/OFF switch to OFF, and unplugs and stows the adjusting load bar power cord. The operator or a crane operator then lowers the overhead crane hook (not shown) and places the four way sling oblong link (eyelet) 87 onto the crane hook. The operator then presses and holds the dead man's switch 109. The stack lights should then display solid GREEN indicating level. The cart operator then signals the crane operator to begin lifting.

The crane operator slowly lifts the adjusting load bar at minimum creep speed, ensuring that the crane lift cable has a vertical appearance from two directions. If the adjusting load bar tilts more than the allowable out of level angle the RED stack light automatically illuminates. The crane operator pauses or slightly lowers the load until the GREEN stack light illuminates.

Once the adjusting load bar is leveled adequately, the dead man's switch 109 can be released, deactivating the leveling operation which is indicated by having the RED or GREEN stack light flash. The reason for the flashing indication can be displayed on the touch screen. This can be deactivation of the dead man's switch 109, pressing the E-Stop button 108, a load bar malfunction, or loss of communications to the adjusting load bar apparatus 30.

Connect the Spreader Bar.

The operator can have the crane operator move the adjusting load bar to the location of the appropriate spreader bar assembly 31. The crane operator lowers the adjusting load bar to a convenient working height, e.g., typically 42 inches above the floor, in an open area near the spreader bar assembly 31. The operator ensures that the spreader bar assembly 31 has, e.g., four coiled nylon lifting sling legs 45 appropriate to the item (module/load) to be lifted, and removes any connection hardware from the mechanical drive unit 35.

The crane operator then lowers the mechanical drive unit 35 of the adjusting load bar to line up with the spreader bar assembly connections (not shown), and the cart operator securely installs the connection hardware including any locking pins (not shown). The crane operator then slowly lifts the combination mechanical drive unit 35 and spreader bar assembly 31 hereinafter intermittently referred to solely as the spreader bar assembly 31, for simplicity. Correspondingly, the cart operator enables automatic leveling by pressing and holding the dead man's switch 109. The stack light will indicate solid GREEN when the adjusting load bar is within the selected tilt limits, solid red otherwise. When the spreader bar assembly 31 is fully suspended, the operator releases the dead man's switch 109. The stack light should be flashing GREEN. The operator then extends the nylon lifting sling legs 45 for the item to be lifted and inspects each sling leg 45 for signs of wear or damage. Additional sling legs 45 not required for the specific lift should remain stowed.

Connect the Load Bar To the Item To Be Lifted.

The operator then moves the mobile cart 103 to an appropriate location in view of the pick up point. The operator then communicates with the crane operator to move the hook holding the spreader bar assembly 31 to a point directly over the expected center of gravity position of the item to be lifted (e.g., module 33) and to lower the spreader bar assembly 31 until the sling legs 45 reach the item 33. To level the adjusting load bar (now including the spreader bar assembly 31), at any time during the operation, the operator presses and holds the dead man's switch 109. Once low enough so that the sling legs 45 reach the item 33, the operator can release the dead man's switch 109 to stop automatic adjustment and securely attach the sling legs 45 to the item 33 to be lifted.

Lift the Load.

The operator first has the crane operator lift the adjusting load bar at creep speed until the lifting straps/legs 45 start tilting the adjusting load bar, while pressing and holding the dead man's switch 109 to allow the carriage 41 of the mechanical drive unit 35 to center. The operator then releases the dead man's switch 109 and tightens the sling legs 45 to reduce slack. At this time, the crane can also be moved slightly if the center of gravity turns out to be somewhat different than initially assumed. These steps are then repeated until the carriage 41 is properly centered over the center of gravity and the load 33 is fully suspended and level. Finally, the load 33 is lifted to clear up any obstructions.

Transition Load To the Delivery Point.

The operator next moves the mobile cart 103 so that it is in the vicinity of the delivery point. The crane operator guides the crane to move the load to the delivery point and lowers the load 33 to its desired resting place, maintaining all four slings tight. If necessary, the cart operator presses and holds the dead man's switch 109 to allow the adjusting load bar to level.

Disconnect From the Load.

The crane operator lowers the load 33 at creep speed. As the adjusting load bar tilts due to the change in the center of gravity, the operator presses and holds the dead man's switch 109 to allow the new center of gravity to be found. After the sling straps/legs 45 go slack, the operator can disconnect them from the load 33. This process is repeated until all four straps/legs 45 are disconnected and stowed on the spreader bar assembly 31.

Disconnect the Spreader Bar.

Having completed the transport of the load 33, the operator has the crane operator return the adjusting load bar to a point just above the spreader bar assembly storage area, and lowers the adjusting load bar at creep speed. If necessary, the operator presses and holds the dead man's switch 109 to allow adjusting load bar to level. The lowering and leveling steps are repeated until the locking hardware is unloaded. Once complete, the operator releases the dead man's switch 109 and removes the locking hardware, and the crane operator slowly lifts the adjusting load bar away from the spreader bar assembly 31 at creep speed. As with previous operations with or without a load, the operator presses and holds the dead man's switch 109 to allow the carriage 41 to adjust to the new center of gravity as the adjusting load bar is lifted free. The crane operator positions the adjusting load bar to a working height, for example, of approximately 42 inches above the floor so that the operator can easily reattach the hardware used for attaching the spreader bar assembly 31 to the mechanical drive unit 35.

Return the Load Bar To the Storage Rack.

The crane operator moves the remaining portions of the adjusting load bar to a position just above the load bar storage rack, and lowers the assembly at creep speed. If any leveling is required, the cart operator presses and holds the dead man's switch 109, as necessary. Once positioned, the dead man's switch 109 is released, and the crane operator lowers the hook until the switch is loose so that the operator can lift the sling 83 from the hook and release the crane for other work. The operator then stows the sling 83, plugs in the adjusting load bar (mechanical drive unit) power cord into the electrical outlet, turns to ON the load bar charge on/off switch to charge the battery, and turns to OFF the power on/off switch.

Power Down the Mobile Cart.

To complete the operational task, the operator powers down the computer 125 by pressing a touch button, turns to OFF the mobile cart power switch, and unplugs and stows the mobile cart power cord. If the mobile cart also includes a primary cart battery, the operator can leave the power cord plugged in to further charge the battery.

The invention has several advantages. Embodiments of the present invention provide a universal automated adjusting load bar apparatus 30 which can eliminate the need for multiple dedicated center of gravity point lift type load bars. Embodiments of the adjusting load bar apparatus 30 advantageously provides an adjusting load bar which includes a mechanical drive unit 35 and adjusting load bar control system 51, which can utilize electronic tilt sensors 93, 93', compact industrial computers/controllers 91, 91', direct current pulse width modulation motor drives 95, 95', absolute position feedback encoders 97, 97', DC motors 71, 71', screw linear drive actuators 67, 67', and a custom software package 111 controlled, for example, through a touch screen with a graphical user interface displayed on a display of a mobile cart 103. Advantageously, control system 51 can acquire angular tilt position data from multiple independent electronic tilt sensors 93, 93', and independently processes this information through separate computers/controllers 91, 91' to control redundant mechanical linear drive actuators 67, 67' to position the carriage 41 of the mechanical drive unit 35 at the center of gravity of a combination of the adjusting load bar and a load mass being lifted.

The linear drive actuators 67, 67', can advantageously provide necessary motion and two-axis positioning for adjusting the load bar lift point correction relative to the center of gravity of the load mass being lifted. This two-axis center of gravity correction allows the adjusting load bar, and thus the load mass, to maintain a level orientation at all times during a lift. This level orientation process allows for precision lifting of a load mass having unknown center of gravity coordinates. By accurately positioning the crane lifting point over the composite center of gravity of the adjusting load bar and load mass being lifted, a precise vertical lift movement can be accomplished with minimal or no visible lateral movement of the mass as it is elevated from its resting position.

According to embodiments of the apparatus 30, this electro-mechanical adjusting load bar control system 51 can advantageously accomplish the lifting process in a very safe manner by guarding against erratic, unexpected or excessive drive system movement that can result from an electrical, mechanical or software malfunction. According to embodiments of the present invention, the adjusting load bar control system 51, when incorporated into the adjusting load bar, can also advantageously form a self-contained battery powered system. Correspondingly, the adjusting load bar advantageously also provides wireless communication capability with a ground based mobile cart (control) station 103 for allowing ground based operator initiated position control and over ride capability.

Advantageously, according to an embodiment of the present invention, the adjusting load bar control system 51 can acquire adjusting load bar angular position data from multiple two axis clinometers or gyros 93, 93', rather than pendulum-type sensors or other sensor arrangements which would introduce significant lag into the system. These signals are then processed through two compact controllers 91, 91', (industrial computers) where output drive command signals are sent to pulse width modulation type DC motor controllers 95, 95'. The DC motors 71, 71', receiving the commands in turn drive thread screw type linear actuators 67, 67', for providing position correction in two axes. Advantageously, each primary drive unit can be operated in parallel with a second identical drive unit, where each operate independently rather than in a master slave configuration. Each controller 91, 91' of the respective first and second drive units, utilizes absolute encoders 97, 97' and speed reducers, positioned on the drive screws 67, 67', to verify that resulting movements matches the drive movement command. Two complete and independent two axis drive systems can therefore be incorporated into the adjusting load bar control system 51 for safety purposes.

Advantageously, a third drive (safety) unit including electronic level sensors 93, 93', and a third compact industrial computer/controller 91", can also be incorporated into control system 51 for control system surveillance and safety purposes, providing an integrated multi-level safety control "watch" system. The third computer/controller 91" can compare the input and output signals of the first two computers/controllers 91, 91', along with the additional data acquired from the third set of electronic tilt sensors 93, 93'. If any electronic tilt sensor input or output signal does not match within a preset range, the system 51 proceeds into an orderly preprogrammed emergency stop mode where no additional drive system movement will result. The third computer/controller 91" can also can managed an aerial portion of a dead man's switch circuit, where a remote operator observing the lift must overcome a spring loaded hand held switch 109 at all times to allow the control system 51 to continue correction type movements.

Advantageously embodiments of the adjusting load bar apparatus 30 can permit final leveling of a load 33 within four or fewer incremental lifts, and is to be capable of self-leveling a fully suspended load 33 in a single lift, if necessary. According to various embodiments, the time span for a load that was quickly suspended in a single lift to be corrected and returned to level can be 60 seconds or less after crane vertical movement has stopped. To this end, the linear drive travel speeds are capable of self-leveling a suspended load 33 in a time period of 30 seconds or less for each incremental correction. Embodiments of the present invention also advantageously can provide the operator visual cues indicating an in or an out of tolerance condition, and visual cues regarding operation a dead man's switch 109 provided to override automatic systems.

Advantageously, the control system 51 for the adjusting load bar apparatus 30 allows for a powerful software/program product application 111 that allows for a great deal of flexibility for the operator. The software package 111 has two focused applications, "Tilt" mode and "XY" mode. Within both of these modes the operator has the ability of manual adjustment of the position of the adjusting load bar apparatus. The software/program product 111 also provides for a preset capability, which aids in a timely lift.

In Tilt Mode, the aerial portions of the adjusting load bar apparatus 30 or ("adjusting load bar") are independently correcting to get to a level condition. This is accomplished through the clinometers, computers, output drive command signals, and DC motor controllers, as stated above. Furthermore, the software application 111 allows for preset attitude values, which set the tolerance of the angularity during the lift. The values for the tolerances generated from the clinometers readings are transmitted back to the onboard computer in the mobile cart 103, which runs the internal programmable logic control program. These tolerances directly feed into a green/red stack light, via programmable logic control input/output signals, that indicated when the composite load is either within (green light illuminated) or outside (red light illuminated) of set tolerance.

In XY Mode the clinometers are not a factor for the positioning of the adjusting load bar. In this mode the adjusting load bar can function much like a computer numerical control machine tool with reference to the X and Y axis positions. Again, the control system 51 is still based on the clinometers, computers, output drive command signals, and DC motor controllers, however the clinometers' reading is bypassed since the angularity is not used. While in this mode the absolute encoders 97, 97' give the position of the item based on the position of the X and Y axis. In an exemplary configuration, the adjusting load bar can provide 60 inches of X axis travel and 30 inches of Y axis travel. While in this mode the adjusting load bar can be adjusted by entering an X, Y, and/or X & Y position. After the desired position is entered and the operator has depressed the dead man switch 109 the carriage 41 will move to the programmed position.

Other powerful applications of the control system 51 can be found in both the Tilt and XY modes. For example, both modes allow for manual adjustment of the position of the item (or load) to be lifted. The software 111, in the exemplary configuration, has three preset intervals that can be entered to allow for adjustments as rough as one inch to as fine as one hundredth of an inch (0.01"). This is a critical feature during the placement of the item. For example, when trying to position an item which locates on long lead pins, a binding condition may be created if the item and pins are not correctly aligned. Assuming that the adjusting load bar has properly leveled the item and the pins are not level, the manual adjustment feature allows the operator to change the angularity of the item when a binding condition is incurred. With a traditional load bar, the item would have to be set back on the original set place so that the traditional load bar be adjusted, which leads to a great amount of wasted time. The ability to adjust "in air," rather than on the ground, greatly decreases the amount of time per move and allows for a great amount of flexibility during a lift.

Various embodiments of the present invention also have several advantages beyond those involving improved safety and time savings. By providing a multi-use adjusting load bar, embodiments of the present invention can significantly reduce floor space requirements, another form of overhead cost reduction. Embodiments of the adjusting load bar can provide an extremely lightweight structure having a very high lifting capacity. That is, embodiments of the load bar can automatically center even a very heavy load, ensuring accurate positioning of the load during both lifting and lowering operations, without adding an excessive amount of weight to the total being lifted by, for example, an overhead crane.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. A method of lifting a load mass with an automated load bar, the method comprising the steps of:

receiving or accessing X and Y axis tilt data for X and Y axes from an associated one or more inclinometers or gyros:

deriving a control signal responsive to the X and Y axis tilt data to drive a pair of DC motors for a mechanical drive unit each associated with a separate one of the X and Y axes to thereby position an adjustable load bar carriage of the mechanical drive unit at a proper juxtaposition with respect to a center of gravity of a combination of the mechanical drive unit, a load mass being stabilized by the mechanical drive unit, and a spreader bar assembly when operatively positioned between the mechanical drive unit and the load mass, to thereby dampen any rotational tendencies and stabilize the mechanical drive unit; and receiving or accessing current positioning of a plurality of drive screws to calculate a number of rotations of the pair of DC motors necessary to position the adjustable load bar carriage in the proper juxtaposition with the center of gravity.

2. A method of lifting a load mass with an automated load bar, the method Comprising the steps of:

receiving or accessing X and Y axis tilt data for X and Y axes from an associated one or more inclinometers or gyros;

deriving a control signal responsive to the X and Y axis tilt data to drive at least one motor for a mechanical drive unit to thereby position an adjustable load bar carriage of the mechanical drive unit at a proper juxtaposition with respect to a center of gravity of a combination of the mechanical drive unit, a load mass being stabilized by the mechanical drive unit, and a spreader bar assembly when operatively positioned between the mechanical drive unit and the load mass, to thereby dampen any rotational tendencies and stabilize the mechanical drive unit;

receiving or accessing a preselected tilt tolerance for each of the X and Y axes; and ordering an emergency stop responsive to a tilt of the mechanical drive unit exceeding one or more of the preselected till tolerances.

3. A method of lifting a load mass with an automated load bar, the method comprising the steps of:

receiving or accessing X and Y axis tilt data from an associated one or more inclinometers or gyros;

deriving a control signal responsive to the X and Y axis tilt data to drive at least one motor for a mechanical drive unit to thereby position an adjustable load bar carriage of the mechanical drive unit at a proper juxtaposition with respect to a center of gravity of a combination of the mechanical drive unit, a load mass being stabilized by the mechanical drive unit, and a spreader bar assembly when operatively positioned between the mechanical drive unit and the load mass, to thereby dampen any rotational tendencies and stabilize the mechanical drive unit;

driving the adjustable load bar carriage of the mechanical drive unit simultaneously by each of a first and a second motion controller along a same axis to position the adjustable load bar carriage at the proper juxtaposition with respect to the center of gravity of the combination of the mechanical drive unit, the load mass, and the spreader bar assembly when operatively position therebetween; and ordering an emergency stop responsive to a mismatch between output instructions of either of the first and second motion controllers, or responsive to a mismatch between an expected and an actual physical orientation of the mechanical drive unit.

4. A method of lifting a load mass with an automated load bar, the method comprising the steps of:

receiving or accessing X and Y axis tilt data from an associated one or more inclinometers or gyros;

deriving a control signal responsive to the X and Y axis tilt data to drive at least one motor for a mechanical drive unit to thereby position an adjustable load bar carriage of the mechanical drive unit at a proper juxtaposition with respect to a center of gravity of a combination of the mechanical drive unit, a load mass being stabilized by the mechanical drive unit, and a spreader bar assembly when operatively positioned between the mechanical drive unit and the load mass, to thereby dampen any rotational tendencies and stabilize the mechanical drive unit;

providing an XY display screen to display X and Y axis positions of the carriage, and pitch and roll orientation of the mechanical drive unit, and to display commanded X and Y axis movements of the carriage along with respective X and Y axis movement error; and changing commanded X and Y axis positions of the carriage up to a preset limit by the operator using a joystick responsive to the provision of carriage position information provided on the display screen.

5. The method as defined in claim 4, further comprising the step of changing the commanded pitch and the roll orientation of the mechanical drive unit by the operator using the joystick responsive to the provision of mechanical drive unit orientation information provided on the display screen.

6. The method as defined in claim 5, further comprising the step of wirelessly communicating the position and orientation changes between a mobile cart and a mechanical drive unit controller.

7. The method as defined in claim 6, wherein the mobile cart includes a dead man's switch, the method further comprising the steps of:

engaging the dead man's switch during execution of all automated carriage positioning operations when the mechanical drive unit is interfaced with the load mass; and releasing the dead man's switch to immediately cease the automated carriage positioning operations.

8. A method of lifting a load mass with an automated load bar, the method comprising the steps of:

acquiring, by a first controller, automated load bar angular position data associated with a first axis from a first angular position sensor and angular position data associated with a second axis from a third angular position sensor;

acquiring, by a second controller, automated load bar angular position data associated with the first axis from a second angular position sensor and angular position data associated with the second axis from a fourth angular position sensor;

processing the automated load bar angular position data from the first and the second angular position sensors to thereby compare first axis angular position data acquired by the first controller with first axis angular position data acquired by the second controller to thereby detect a mismatch between the first axis angular position data acquired by the first controller and the first axis angular position data acquired by the second controller;

processing the automated load bar angular position data from the third and the fourth angular position sensors to thereby compare second axis angular position data acquired by the first controller with second axis angular position data acquired by the second controller to thereby detect a mismatch between the second axis angular position data acquired by the first controller and the second axis angular position data acquired by the second controller; and disengaging automated load bar lift point correction functions responsive to either detecting a mismatch between the first axis angular position data acquired by the first controller and the first axis angular position data acquired by the second controller being outside a first preselected range, or detecting a mismatch between the second axis angular position data acquired by the first controller and the second axis angular position data acquired by the second controller being outside a second preselected range.

9. The method as defined in claim 8, wherein the second axis is substantially perpendicular to the first axis, the angular position data acquired from the second angular position sensor acquired independent of the data acquired from the first electronic angular sensor, the angular position data acquired from the fourth angular position sensor acquired independent of the data acquired from the third electronic angular sensor.

10. The method as defined in claim 9, wherein the first preselected range is equal to the second preselected range to provide a preset attitude value tolerance in both the first and the second axes.

11. The method as defined in claim 8, further comprising:

acquiring automated load bar angular position data from a fifth electronic angular sensor associated with the first axis and a sixth electronic angular sensor associated with the second axis;

processing the angular position data of the fifth electronic angular sensor by a third controller to thereby compare first axis angular position data acquired by the third controller from the fifth electronic angular sensor with first axis angular position data acquired by one or more of the first and the second controllers to thereby detect a mismatch between the first axis angular position data acquired by the third controller and the first axis angular position data acquired by the first or the second controllers;

processing the angular position data of the sixth electronic angular sensor by the third controller to thereby compare second axis angular position data acquired by the third controller from the sixth electronic angular sensor with second axis angular position data acquired by one or more of the first and the second controllers to thereby detect a mismatch between the second axis angular position data acquired by the third controller and the second axis angular position data acquired by the first or the second controllers; and disengaging automated load bar lift point correction functions responsive to either detecting a mismatch between the first axis angular position data acquired by the third controller and the first axis angular position data acquired by either the first or the second controllers outside the first preselected range, or detecting a mismatch between the second axis angular position data acquired by the third controller and the second axis angular position data acquired by either the first or the second controllers outside the second preselected range.

12. A method of lifting a load mass with an automated load bar, the method comprising the steps of:

acquiring, by a first controller, mechanical linear actuator position feedback data associated with a first axis for a first mechanical linear drive actuator and position feedback data associated with a second axis for a third mechanical linear drive actuator;

acquiring, by a second controller, mechanical linear actuator position feedback data associated with the first axis for a second mechanical linear drive actuator and position feedback data associated with the second axis for a fourth mechanical linear drive actuator;

processing the mechanical linear actuator position feedback data for first and second mechanical linear actuators to thereby compare mechanical linear actuator position feedback data for the first mechanical linear actuator with the mechanical linear actuator position feedback data for the second linear actuator;

processing the mechanical linear actuator position feedback data for the third and the fourth actuators to thereby compare mechanical linear actuator position feedback data for the third mechanical linear actuator with the mechanical linear actuator position feedback data for the fourth linear actuator; and disengaging automated load bar lift point correction functions responsive to either detecting a mismatch between mechanical linear actuator position feedback data outside a first preselected range for either of the first and the second mechanical linear actuators, or detecting a mismatch between the mechanical linear actuator position feedback data outside a second preselected range for either of the third and the fourth mechanical linear actuators.

13. The method as defined in claim 12, wherein the position feedback data for the second mechanical linear drive actuator is independent of the position feedback data for the first mechanical linear drive actuator, and wherein the position feedback data for the fourth mechanical linear drive actuator is independent of the position feedback data for the third mechanical linear drive actuator.

14. The method as defined in claim 13, wherein the first preselected range is equal to the second preselected range to provide a preset load bar attitude value tolerance in both the first and the second axis; and wherein the method further comprises the step of selecting one of a plurality of preset attitude values defining the first and the second preselected ranges.

15. A method of lifting a load mass with an automated load bar, the method comprising the steps of:

acquiring automated load bar angular position data from a first electronic angular sensor and a second electronic angular sensor, the angular position data for the second electronic angular sensor acquired independent of the data acquired from the first electronic angular sensor;

processing the angular position data of the first electronic angular sensor by a first controller to thereby drive a first mechanical linear drive actuator; and processing the angular position data of the second electronic angular sensor by a second controller to thereby drive a second mechanical linear drive actuator, the second mechanical linear drive actuator operating in parallel with the first mechanical linear drive actuator to provide redundant mechanical linear drive control to thereby continuously maintain a substantially level orientation along a first axis during a lift operation.

16. The method as defined in claim 15, further comprising the steps of:

processing position feedback from a position encoder associated with each separate mechanical linear drive to verify that movement of each of said respective mechanical linear drive actuators matches associated controller drive movement commands; and disengaging automated load bar lift point correction functions responsive to either the first or the second controller detecting a mismatch outside a preselected range between an associated controller drive movement command and the position feedback for either of said respective mechanical linear drive actuators.

17. The method as defined in claim 15, further comprising the steps of:

acquiring automated load bar angular position data from a third electronic angular sensor and a fourth electronic angular sensor, the angular position data for the fourth electronic angular sensor acquired independent of the data acquired from the third electronic angular sensor;

processing the angular position data of the third electronic angular sensor by a first controller to thereby drive a third mechanical linear drive actuator; and processing the angular position data of the fourth electronic angular sensor by a second controller to thereby drive a fourth mechanical linear drive actuator, the fourth mechanical linear drive actuator operating in parallel with the third mechanical linear drive actuator to provide redundant mechanical linear drive control to thereby continuously maintain a substantially level orientation along a second axis during the lift operation, the combination of the first and second linear drive actuators operating in parallel with each other and the third and fourth linear drive actuators operating in parallel with each other to provide two-axis positioning for automated load bar lift point correction relative to a center of gravity of the load mass being lifted.

18. The method as defined in claim 17, further comprising the steps of:

acquiring automated load bar angular position data from a fifth electronic angular sensor associated with the first axis and a sixth electronic angular sensor associated with the second axis;

processing the angular position data of the fifth electronic angular sensor by a third controller to thereby compare first axis angular position data acquired by the third controller from the fifth electronic angular sensor with first axis angular position data acquired by one or more of the first and the second controllers to thereby detect a mismatch between the first axis angular position data acquired by the third controller and the first axis angular position data acquired by the first or the second controllers;

processing the angular position data of the sixth electronic angular sensor by the third controller to thereby compare second axis angular position data acquired by the third controller from the sixth electronic angular sensor with second axis angular position data acquired by one or more of the first and the second controllers to thereby detect a mismatch between the second axis angular position data acquired by the third controller and the second axis angular position data acquired by the first or the second controllers; and disengaging automated load bar lift point correction functions responsive to either detecting a mismatch outside a preselected range between the first axis angular position data acquired by the third controller and the first axis angular position data acquired by either the first or the second controllers, or detecting a mismatch outside a preselected range between the second axis angular position data acquired by the third controller and the second axis angular position data acquired by either the first or the second controllers.

* * * * *